United States Patent
Sando et al.

(10) Patent No.: US 12,523,581 B2
(45) Date of Patent: Jan. 13, 2026

(54) DILUTER, ANALYSIS SYSTEM, AND ANALYSIS METHOD

(71) Applicant: HORIBA, LTD., Kyoto (JP)

(72) Inventors: Shota Sando, Kyoto (JP); Yusuke Mizuno, Kyoto (JP); Jun Tomita, Kyoto (JP); Hirotaka Iseki, Kyoto (JP)

(73) Assignee: HORIBA, LTD., Kyoto (JP)

( * ) Notice: Subject to any disclaimer, the term of this patent is extended or adjusted under 35 U.S.C. 154(b) by 573 days.

(21) Appl. No.: 17/914,622

(22) PCT Filed: Mar. 24, 2021

(86) PCT No.: PCT/JP2021/012352
§ 371 (c)(1),
(2) Date: Sep. 26, 2022

(87) PCT Pub. No.: WO2021/193753
PCT Pub. Date: Sep. 30, 2021

(65) Prior Publication Data
US 2023/0123798 A1    Apr. 20, 2023

(30) Foreign Application Priority Data
Mar. 26, 2020 (JP) .................. 2020-055922

(51) Int. Cl.
*G01N 1/38* (2006.01)
*G01N 1/22* (2006.01)
(Continued)

(52) U.S. Cl.
CPC ............ *G01N 1/38* (2013.01); *G01N 1/2205* (2013.01); *G01N 15/0618* (2013.01);
(Continued)

(58) Field of Classification Search
CPC .. G01N 30/88; G01N 1/2205; G01N 33/0011; G01N 21/714; G01N 15/04;
(Continued)

(56) References Cited

U.S. PATENT DOCUMENTS 7,044,009 B2 * 5/2006 Graze, Jr. ............ G01N 1/2252
73/863.03
2003/0213311 A1 11/2003 Graze, Jr.
(Continued)

FOREIGN PATENT DOCUMENTS

CN  101187608 A   5/2008
CN  204649518 U   9/2015
(Continued)

OTHER PUBLICATIONS

Chinese Office Action dated Sep. 10, 2024, for Chinese Application No. 202180023296.7; 10 pages.
(Continued)

*Primary Examiner* — Brandi N Hopkins
(74) *Attorney, Agent, or Firm* — Brooks Kushman PC

(57) ABSTRACT

To uniformly dilute particulate matter contained in a sample gas, a diluter includes an inflow portion, a mixing portion, a discharge portion, a connection portion, and an introduction portion. The inflow portion allows a sample gas to flow in. The mixing portion has an inner diameter larger than that of the inflow portion, and mixes the sample gas with a dilution gas to generate a diluted sample gas. The discharge portion discharges the diluted sample gas. The connection portion has a first tapered part whose inner diameter increases from a side connected to the inflow portion toward a side connected to the mixing portion. The introduction portion introduces the dilution gas into an internal space from a position downstream of the connection between the first tapered part and the inflow portion.

18 Claims, 15 Drawing Sheets

(51) Int. Cl.
*G01N 15/00* (2024.01)
*G01N 15/06* (2024.01)
*G01N 33/00* (2006.01)

(52) U.S. Cl.
CPC . *G01N 33/0018* (2013.01); *G01N 2001/2261* (2013.01); *G01N 2001/2264* (2013.01); *G01N 2001/227* (2013.01); *G01N 2001/386* (2013.01); *G01N 2015/0046* (2013.01)

(58) Field of Classification Search
CPC .. G01N 1/24; G01N 1/34; G01N 1/22; G01N 1/38; G01N 1/2252; G01N 15/00; G01N 1/2202; G01N 15/06; G01N 1/00; G01N 1/2247; G01N 15/0618; G01N 33/0018; G01N 2001/2261; G01N 2001/2264; G01N 2001/227; G01N 2001/386; G01N 2015/0046; G01F 1/34; G05D 7/0658; A43B 17/02; G01M 15/106; G01M 15/10; F01N 11/00; F01N 11/02; F01N 11/002; F04B 45/04
USPC ............................................................ 73/232
See application file for complete search history.

(56) References Cited

U.S. PATENT DOCUMENTS

| | | | |
|---|---|---|---|
| 2007/0125188 A1 | 6/2007 | Kreft | |
| 2008/0060453 A1 | 3/2008 | Liu et al. | |
| 2010/0186523 A1 | 7/2010 | Vesala | |
| 2012/0090377 A1 | 4/2012 | Matsuyama et al. | |
| 2014/0093435 A1* | 4/2014 | Giechaskiel ....... | B01D 53/9477 422/169 |
| 2014/0260542 A1 | 9/2014 | Nagano et al. | |
| 2015/0338534 A1 | 11/2015 | Mizuno et al. | |
| 2019/0064035 A1 | 2/2019 | Ochiai et al. | |
| 2019/0113422 A1 | 4/2019 | Otsuki | |
| 2021/0278325 A1 | 9/2021 | Han et al. | |

FOREIGN PATENT DOCUMENTS

| | | | |
|---|---|---|---|
| EP | 1358927 A1 | 11/2003 |
| EP | 1358927 B1 | 11/2005 |
| EP | 3407051 A1 | 11/2018 |
| FR | 2939890 A3 | 6/2010 |
| JP | H67047 U | 1/1994 |
| JP | 2002071528 A | 3/2002 |
| JP | 200328765 A | 1/2003 |
| JP | 200335636 A | 2/2003 |
| JP | 2003083949 A | 3/2003 |
| JP | 2003344238 A | 12/2003 |
| JP | 2005209427 A | 8/2005 |
| JP | 2006194726 A | 7/2006 |
| JP | 2008164474 A | 7/2008 |
| JP | 2008249384 A | 10/2008 |
| JP | 2009175048 A | 8/2009 |
| JP | 2009198118 A | 9/2009 |
| JP | 2010261938 A | 11/2010 |
| JP | 2015219197 A | 12/2015 |
| JP | 2018-197711 A | 12/2018 |
| JP | 201945283 A | 3/2019 |
| JP | 201974388 A | 5/2019 |
| KR | 20010081585 A | 8/2001 |
| KR | 1020160116673 A | 10/2016 |
| KR | 20200006257 A | 1/2020 |

OTHER PUBLICATIONS

English Translation of the Chinese Office Action dated Sep. 10, 2024, for Chinese Application No. 202180023296.7; 11 pages.
Chinese Office Action dated Mar. 3, 2025 for related Chinese Appln. No. 202180023296.7; 11 Pages.
Japanese Notice of Allowance dated Mar. 28, 2025 for related Japanese Appln. No. 2022-510618; 4 Pages.
Japan Office Action dated Nov. 19, 2024; for related Japan Appln. No. 2022-510618; 6 Pages.
Translation of Japan Office Action dated Nov. 19, 2024; for related Japan Appln. No. 2022-510618; 6 Pages.
International Search Report dated Jun. 1, 2021, for International Patent Application No. PCT/JP2021/012352; 3 pages.
Extended European Search Report dated Feb. 23, 2024, for European Application No. 21775910.9; 11 pages.
Chinese Office Action dated May 13, 2025 for related Chinese Appln. No. 202180023296.7; 9 Pages.
European Chinese Office Action dated Jul. 11, 2025 for related European Appln. No. 21775910.9; 9 Pages.
India Office Action dated Oct. 28, 2025 for related India Appln. No. 202217055989; 6 Pages.

* cited by examiner

DILUTER, ANALYSIS SYSTEM, AND ANALYSIS METHOD

CROSS-REFERENCE TO RELATED APPLICATION

This application is the U.S. national phase of PCT Application No. PCT/JP2021/012352 filed on Mar. 24, 2021, which claims priority to Japanese Patent Application No. JP 2020-055922 filed on Mar. 26, 2020, the disclosures of which are incorporated in their entirety by reference herein.

TECHNICAL FIELD

The present invention relates to a diluter that dilutes particulate matter contained in a sample gas, an analysis system that analyzes the particulate matter contained in the sample gas diluted by the diluter, and a method for analyzing the particulate matter using the analysis system.

BACKGROUND ART

Conventionally, there is known an analysis device that analyzes particulate matter contained in a sample gas such as atmospheric gas to be measured. For instance, there is known an analysis device, in which a sample gas is blown to a collection filter, such that particulate matter contained in the sample gas is collected by the collection filter, and collected amount (mass concentration) of the particulate matter collected by the collection filter, and/or elements (and their concentrations) contained in the particulate matter are measured (see, for example, Patent Citation 1).

There is known an analysis device that analyzes particulate matter contained in an automobile exhaust gas. In this analysis device, a sampled engine exhaust gas is diluted or vaporized, and then the number concentration of the particulate matter in the exhaust gas is measured by a particle number counter (see, for example, Patent Citation 2)

PRIOR ART CITATIONS

Patent Citation

Patent Citation 1: JP-A-2015-219197
Patent Citation 2: JP-A-2010-261938

SUMMARY OF INVENTION

Technical Problem

Presently, it is studied to use the analysis device described above for a purpose of analyzing particulate matter contained in an exhaust gas or the like. In general, however, the exhaust gas contains particulate matter at a high concentration, and if the exhaust gas containing particulate matter at a high concentration is sampled as it is, there will occur a problem such as clogging in a collection unit that collects the exhaust gas. Therefore, it is considered that, when using the analysis device described above to analyze particulate matter contained in the exhaust gas, the analysis device samples the exhaust gas that is diluted by a diluter.

In addition, for example, an exhaust gas generated in a combustion process or the like may contain particulate matter at a high concentration, which has a particle size of a few tens nanometers to a few tens micrometers at a certain concentration. The exhaust gas containing such particulate matter cannot be diluted appropriately by a conventional diluter.

It is because such particulate matter is easily transported by air but is hardly dispersed uniformly due to turbulence generated by collision of a dilution gas that dilutes the particulate matter in a tube.

In addition, if the gas containing the particulate matter contacts with an inner wall surface of the diluter, the particulate matter contained in the gas adheres to the inner wall surface and is hardly removed again. In other words, a part of the particulate matter contained in the gas flowing into the diluter remains in the diluter and becomes a loss, and hence the particulate matter in the gas cannot be diluted at a constant dilution ratio.

Further, for example, even though it is a combustion process, a gasoline engine may generate an exhaust gas containing particulate matter having a particle size of a few tens nanometers at a high concentration. Such particulate matter with an order of nanometer causes dispersion due to Brownian movement, and hence has a tendency to be dispersed uniformly into a gas more easily than particulate matter having a particle size of a few tens micrometers.

On the other hand, if the gas containing the particulate matter with an order of nanometer contacts with the inner wall surface of the diluter, the particulate matter enters into a micro recess of the inner wall surface and is hardly removed again. In other words, a part of the particulate matter contained in the gas flowing into the diluter remains in the diluter and becomes a loss, and hence the particulate matter in the gas cannot be diluted at a constant dilution ratio.

If the particulate matter to be measured cannot be diluted appropriately in this way, it is difficult to accurately measure a concentration of the particulate matter.

It is an object of the present invention to uniformly dilute particulate matter contained in a sample gas containing the particulate matter, and to minimize a loss of the particulate matter due to adhesion of the particulate matter to the wall surface during the dilution process, to realize accurate dilution.

Technical Solution

A plurality of embodiments as means that solves the problem are described below. These embodiments can be arbitrarily combined as necessary.

A diluter according to an aspect of the present invention includes an inflow portion, a mixing portion, a discharge portion, a connection portion, and an introduction portion.

The inflow portion allows the sample gas containing particulate matter to flow in.

The mixing portion has an inner diameter larger than that of the inflow portion, and mixes the sample gas flowing in from the inflow portion with a dilution gas in an internal space, to generate a diluted sample gas.

The discharge portion discharges the diluted sample gas.

The connection portion connects the inflow portion and the mixing portion, and has a first tapered part whose inner diameter increases from a side connected to the inflow portion toward a side connected to the mixing portion.

The introduction portion introduces the dilution gas into the internal space from a position downstream of the connection between the first tapered part and the inflow portion.

The diluter described above has the structure in which the introduction portion introduces the dilution gas from a position downstream of the connection between the first tapered part and the inflow portion, and hence the dilution gas is introduced after the sample gas containing the particulate matter is introduced into the internal space of the first tapered part. In this way, the particulate matter can be uniformly dispersed in the internal space of the mixing portion, and hence the particulate matter contained in the sample gas can be uniformly diluted.

The introduction portion may introduce the dilution gas into the internal space in a direction diagonal to an inflow direction of the sample gas into the internal space.

In this way, the particulate matter can be dispersed more uniformly in the internal space of the mixing portion.

The introduction portion may introduce the dilution gas into the internal space in a direction perpendicular to the inflow direction of the sample gas into the internal space.

In this way, the structure of the introduction portion can be simpler, while the particulate matter can be uniformly dispersed in the internal space of the mixing portion.

The introduction portion may have a plurality of introduction ports arranged along the inflow direction of the sample gas. In this case, it is preferred that one of the plurality of introduction ports is disposed at a position point-symmetric to another one of the plurality of introduction ports with respect to the center of a cross section of the mixing portion.

In this way, the dilution gas is introduced from a plurality of positions along the inflow direction of the sample gas such that the sample gas and the dilution gas can be uniformly mixed. In addition, the dilution gas introduced from one introduction port collides with the dilution gas introduced from another introduction port that is point-symmetric to the one introduction port, at the center and its vicinity of the cross section of the mixing portion, such that the gas in the mixing portion can be prevented from contacting with an inner wall surface of the mixing portion and that gas flow in the mixing portion can be stabilized. As a result, the dispersion of the particulate matter in the mixing portion can be stabilized. Further, as the contact of the gas in the mixing portion with the inner wall surface are reduced, a loss of the particulate matter due to adhesion of the same to the inner wall surface can also be suppressed.

The introduction portion may have a dilution gas filling space that is communicated to the internal space of the mixing portion through the plurality of introduction ports and is filled with the dilution gas.

In this way, the dilution gas can be uniformly introduced from the plurality of introduction ports.

The introduction portion may be provided with a plurality of introduction tubes each of which has one end connected to a position downstream of the connection between the first tapered part and the inflow portion, and the other end that allows the dilution gas to flow in. In this case, it is preferred that one of the plurality of introduction tubes is disposed at a position point-symmetric to another one of the plurality of the plurality of introduction tubes with respect to the center of a cross section of the first tapered part.

In this way, the dilution gas can be introduced after the sample gas containing the particulate matter is introduced into the internal space of the first tapered part. In addition, the dilution gas introduced from one introduction tube collides with the dilution gas introduced from another introduction tube that is point-symmetric to the one introduction tube at the center and its vicinity of the cross section of the first tapered part, such that the gas in the mixing portion can be prevented from contacting with an inner wall surface of the mixing portion and that gas flow in the mixing portion can be stabilized. As a result, dispersion of the particulate matter in the mixing portion can be stabilized. Further, as the contact of the gas in the mixing portion with the inner wall surface is reduced, a loss of the particulate matter due to adhesion of the same to the inner wall surface can also be suppressed.

The mixing portion may include a second tapered part whose inner diameter decreases from an upstream side to a downstream side, and a third tapered part whose inner diameter increases from a side of the second tapered part toward the downstream side.

In this way, the particulate matter can be further dispersed in the internal space of the mixing portion.

The diluter may further include a sampling portion configured to sample the diluted sample gas from the internal space. In this way, the diluted sample gas can be sampled from the internal space of the mixing portion.

The sampling portion may be disposed on the upstream side of the discharge portion. In this way, it is possible to sample the diluted sample gas in which the particulate matter is uniformly dispersed.

A ratio between a cross-sectional area of the sampling portion and that of the internal space at a position where the sampling portion is disposed may be determined such that a flow velocity of the diluted sample gas in the sampling portion is more than that in the internal space.

In this way, a dispersed state of the particulate matter in a vicinity of the position where the sampling portion is disposed can be substantially the same as that in the internal space of the mixing portion.

The diluter described above may further include a vibration portion. The vibration portion vibrates the mixing portion. In this way, the particulate matter, which is adhered to the inside of a side wall of the mixing portion during dilution of the sample gas, can be removed.

The diluter described above may further include a heating portion. The heating portion heats the mixing portion, the connection portion, and the introduction portion.

In this way, even if the sample gas includes volatile organic components and/or moisture, the heating enables the components and/or moisture in the diluter to volatilize, thus the condensation thereof can be suppressed.

An analysis system according to another aspect of the present invention includes a diluter and an analyzing portion.

The diluter mixes a sample gas containing particulate matter with a dilution gas to generate a diluted sample gas.

The analyzing unit analyzes the particulate matter contained in the diluted sample gas.

In the analysis system described above, the diluter includes an inflow portion, a mixing portion, a discharge portion, a connection portion, and an introduction portion.

The inflow portion allows the sample gas to flow in.

The mixing portion has an inner diameter larger than that of the inflow portion, and mixes the sample gas flowing in from the inflow portion with a dilution gas in an internal space to generate a diluted sample gas.

The discharge portion discharges the diluted sample gas.

The connection portion connects the inflow portion and the mixing portion, and has a first tapered part whose inner diameter increases from a side connected to the inflow portion toward a side connected to the mixing portion.

The introduction portion introduces the dilution gas into the internal space from a position downstream of the connection between the first tapered part and the inflow portion.

The diluter provided to the analysis system described above has the structure in which the introduction portion introduces the dilution gas from a position downstream of the connection between the first tapered part and the inflow portion, and hence the dilution gas is introduced after the sample gas containing the particulate matter is introduced into the internal space of the first tapered part. In this way, the particulate matter can be uniformly dispersed in the internal space of the mixing portion, and hence the particulate matter contained in the sample gas can be uniformly diluted.

In addition, the analyzing portion analyzes the particulate matter contained in the diluted sample gas in which the particulate matter contained in the sample gas at a high concentration is diluted, and hence the particulate matter can be accurately analyzed.

The analysis system described above may include a collection unit. The collection unit samples the diluted sample gas and collects the particulate matter contained in the sampled diluted sample gas to a collection filter.

In this way, the particulate matter to be analyzed can be accurately analyzed in the state collected by the collection filter.

The analyzing portion may include a collected amount measuring unit. The collected amount measuring unit measures a collected amount of the particulate matter collected by the collection filter.

In this way, it is possible to obtain accurate information about the collected amount of the particulate matter collected by the collection filter.

The analyzing unit may include a component analyzing unit. The component analyzing unit analyzes components contained in the particulate matter collected by the collection filter.

In this way, accurate information about components contained in the particulate matter collected by the collection filter can be obtained.

The analyzing unit may include a counting unit. The counting unit counts the number of particulate matter (particulate number (PN)). In this way, accurate information about particle number concentration of the particulate matter contained in the diluted sample gas can be obtained.

The analyzing unit may include a diffusion charger sensor (DCS) that determines mass concentration. In this way, the particle number concentration of the particulate matter can be determined.

An analysis method according to still another aspect of the present invention is an analysis method using an analysis system including a diluter and an analyzing unit. The diluter includes an inflow portion, a mixing portion having an inner diameter larger than that of the inflow portion, a discharge portion, a connection portion configured to connect the inflow portion and the mixing portion and to have a first tapered part whose inner diameter increases from a side connected to the inflow portion toward a side connected to the mixing portion, an introduction portion configured to introduce a dilution gas from a position downstream of the connection between the first tapered part and the inflow portion. The analysis method includes:

mixing a sample gas containing particulate matter flowing in from the inflow portion with the dilution gas introduced through the introduction portion, in the internal space of the mixing portion, to generate a diluted sample gas; and analyzing the particulate matter contained in the diluted sample gas using the analyzing unit.

The diluter used in the analysis method described above has the structure in which the introduction portion introduces the dilution gas from a position downstream of the connection between the first tapered part and the inflow portion, and hence the dilution gas is introduced after the sample gas containing the particulate matter is introduced into the internal space of the first tapered part. In this way, the particulate matter can be uniformly dispersed in the internal space of the mixing portion, and hence the particulate matter contained in the sample gas can be uniformly diluted.

In addition, by analyzing the particulate matter contained in the diluted sample gas, the particulate matter can be accurately analyzed.

Advantageous Effects

As the dilution gas is introduced after the sample gas containing the particulate matter is introduced into the internal space of the first tapered part, the particulate matter can be uniformly dispersed in the internal space of the mixing portion. As a result, the particulate matter contained in the sample gas can be uniformly diluted.

DESCRIPTION OF EMBODIMENTS

1. First Embodiment (1) Analysis System

Hereinafter, an analysis system 100 according to this embodiment is described. The analysis system 100 is a system that can be used as a continuous emission monitoring system (CEMS), which continuously analyzes particulate matter FP generated in various combustion processes (such as a combustion process in a thermal power plant, an iron manufacturing plant, or an incinerator, or a combustion process of coal). The particulate matter FP that can be measured includes, for example, unburned matter in ash generated by the combustion process of coal, and fly ash generated in various combustion processes.

In addition, without limiting to the particulate matter FP generated in combustion processes, for example, dust generated from various transportation devices (such as automobiles and ships) (dust from brakes, tires, internal combustion engines, steam engines, exhaust gas purification devices, or motors) can be the particulate matter FP to be measured by the analysis system 100. Further, dust (such as volcanic ash) generated by volcanic eruption or other natural disaster, dust generated by mine development, and the like can also be the particulate matter FP to be measured.

Figure 1:
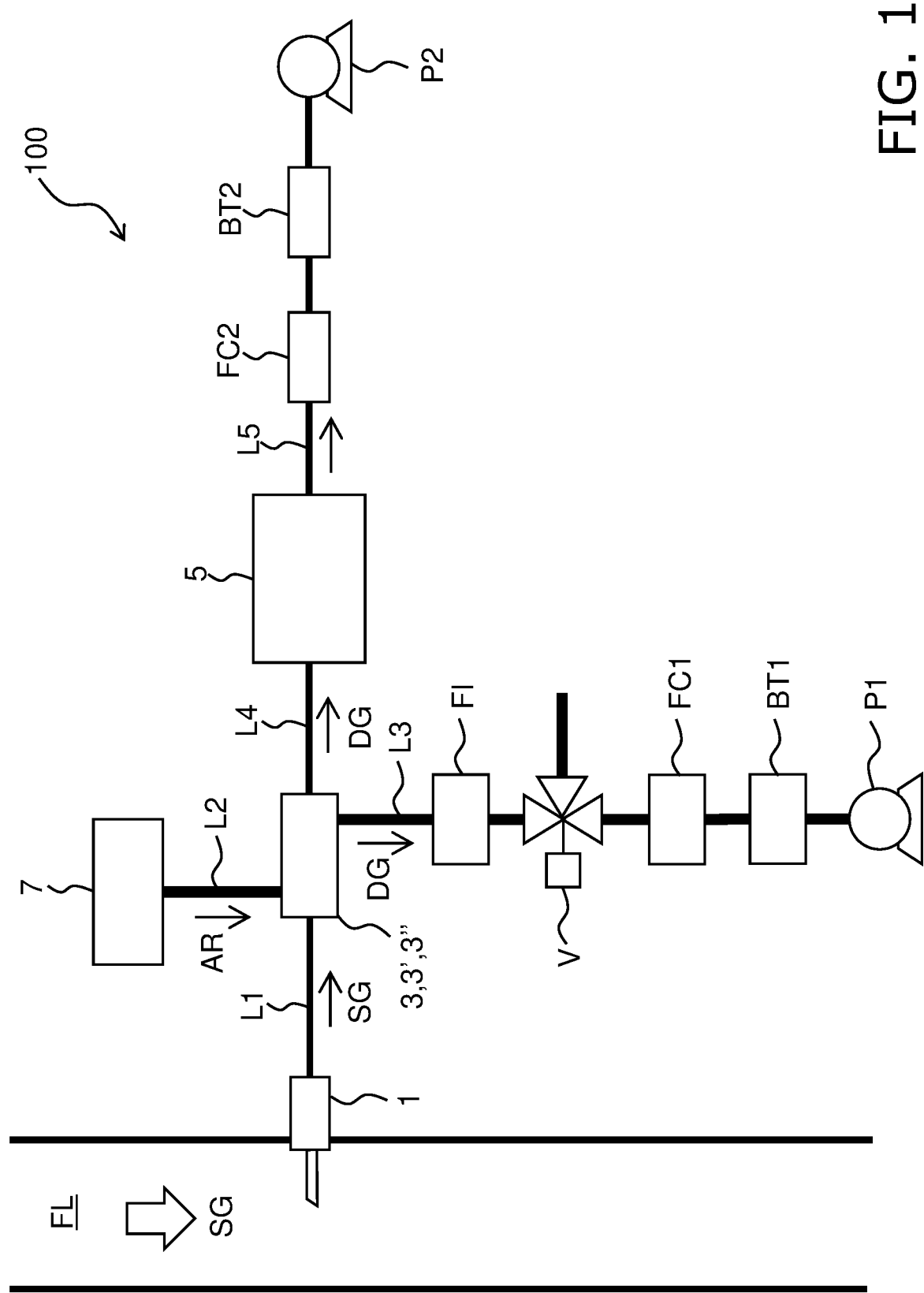
FIG. 1 is a schematic diagram illustrating a structure of an analysis system.

Hereinafter, with reference to FIG. 1, a structure of the analysis system 100 according to the first embodiment is described. FIG. 1 is a schematic diagram illustrating a structure of the analysis system. The analysis system 100 illustrated in FIG. 1 is a system configured to analyze the particulate matter FP contained in an exhaust gas generated in the combustion process, which is a gas to be measured (hereinafter referred to as a sample gas SG).

The analysis system 100 mainly includes a sampling probe 1, a diluter 3, and an analysis device 5.

The sampling probe 1 is fixed at a predetermined position on a side wall of a flue FL, to sample the sample gas SG from the flue FL in which the sample gas SG flows.

The sampling probe 1 samples from the flue FL the sample gas SG at a flow rate, which is determined from a gas suction rate of a first pump P1 connected via the diluter 3, a gas suction rate of a second pump P2 connected via the diluter 3 and the analysis device 5, and a feed rate of a dilution gas AR (described later) to the diluter 3.

The diluter 3 is connected to the sampling probe 1 via a first gas line L1, and is connected to a feeding device 7 that feeds the dilution gas AR via a second gas line L2. The diluter 3 mixes the sample gas SG sampled by the sampling probe 1 with the dilution gas AR fed from the feeding device 7 to generate a diluted sample gas DG. In other words, the diluter 3 generates the diluted sample gas DG in which concentration of the particulate matter FP is reduced to less than that of the sample gas SG.

In this embodiment, the dilution gas AR is air. In this case, the feeding device 7 is a device that adjusts flow rate of instrument air and feeds the same as the dilution gas AR, for example. Other than that, the feeding device 7 may be a device that adjusts flow rate of nitrogen or air supplied from a nitrogen cylinder or a (dried) air cylinder and feeds the same as the dilution gas AR.

Other than that, for example, air in an atmospheric gas sucked by a pump may be fed as the dilution gas AR after removing dust by a dust filter, removing moisture by a drying treatment device, and adjusting flow rate thereof. In this way, even if the instrument air, the cylinder, or the like cannot be used, for example, the dilution gas AR can be fed.

In addition, the diluter 3 is connected to the first pump P1 via a third gas line L3, and is connected to the analysis device 5 via the fourth gas line L4. A part of the diluted sample gas DG generated by the diluter 3 is sampled by the analysis device 5 via a fourth gas line L4, and the other part of the diluted sample gas DG is sucked by the first pump P1 and is discharged.

It should be noted that the analysis device 5 is connected to the second pump P2 via a fifth gas line L5, to sample the diluted sample gas DG by a sucking force of the second pump P2.

As illustrated in FIG. 1, the third gas line L3, in which the diluted sample gas DG flows to be discharged, is connected to a first buffer tank BT1, a first flow rate adjuster FC1, and a filter FI. The first buffer tank BT1 suppresses gas ripples in the third gas line L3. The first flow rate adjuster FC1 adjusts flow rate of the diluted sample gas DG that is discharged. The filter FI collects particles contained in the diluted sample gas DG, and minimizes the particulate matter FP contained in the gas that is discharged outside.

It should be noted that if it is supposed that the sample gas SG and/or the dilution gas AR contain a lot of moisture, a device such as a drain pot for eliminating moisture from the gas may be provided to the third gas line L3.

In addition, the third gas line L3 is provided with a three-way valve V between the filter FI and the first flow rate adjuster FC1. The three-way valve V is a valve that switches connection and disconnection of gas between the first pump P1 and the diluter 3. It should be noted that, when the three-way valve V disconnects between the first pump P1 and the diluter 3, it connects between the first pump P1 and the atmospheric gas.

While the dilution gas AR is fed from the feeding device 7, by disconnecting between the first pump P1 and the diluter 3 by the three-way valve V, the dilution gas AR from the diluter 3 passes through the first gas line L1 and is discharged from the sampling probe 1 into the flue FL, so that the particulate matter FP accumulated and adhered to the sampling probe 1 and the first gas line L1 can be removed and discharged into the flue FL (blowback).

In addition, when the blowback described above is performed, the dilution gas AR also passes through the fourth gas line L4 and flows to the analysis device 5, and hence the particulate matter FP accumulated and adhered to the fourth gas line L4 can also be removed simultaneously.

On the other hand, the fifth gas line L5 that connects the analysis device 5 and the second pump P2 is connected to a second flow rate adjuster FC2 and a second buffer tank BT2. The second flow rate adjuster FC2 adjusts flow rate of the diluted sample gas DG sampled by the analysis device 5. The second buffer tank BT2 suppresses gas ripples in the fifth gas line L5.

In this embodiment, the first gas line L1 that connects the sampling probe 1 and the diluter 3, and the fourth gas line L4 that connects the diluter 3 and the analysis device 5 are conductive gas lines, which are connected to a ground. In this way, it is possible to suppress adhesion of the particulate matter FP contained in the sample gas SG and the diluted sample gas DG to the first gas line L1 and the fourth gas line L4 until the particulate matter FP reaches the analysis device 5.

As the conductive gas line that can be used as the first gas line L1 and the fourth gas line L4, for example, there is a conductive tube made of rubber mixed with conductive carbon.

The analysis device 5 is a device that analyzes the particulate matter FP contained in the diluted sample gas DG sampled from the diluter 3. In this embodiment, the analysis device 5 collects the particulate matter FP contained in the diluted sample gas DG to a collection filter 51 (FIG. 7), measures collected amount (mass concentration) of the particulate matter FP collected to the collection filter 51, and performs content analysis of the particulate matter FP.

(2) Diluter

(2-1) Specific Structure of Diluter

Figure 2:
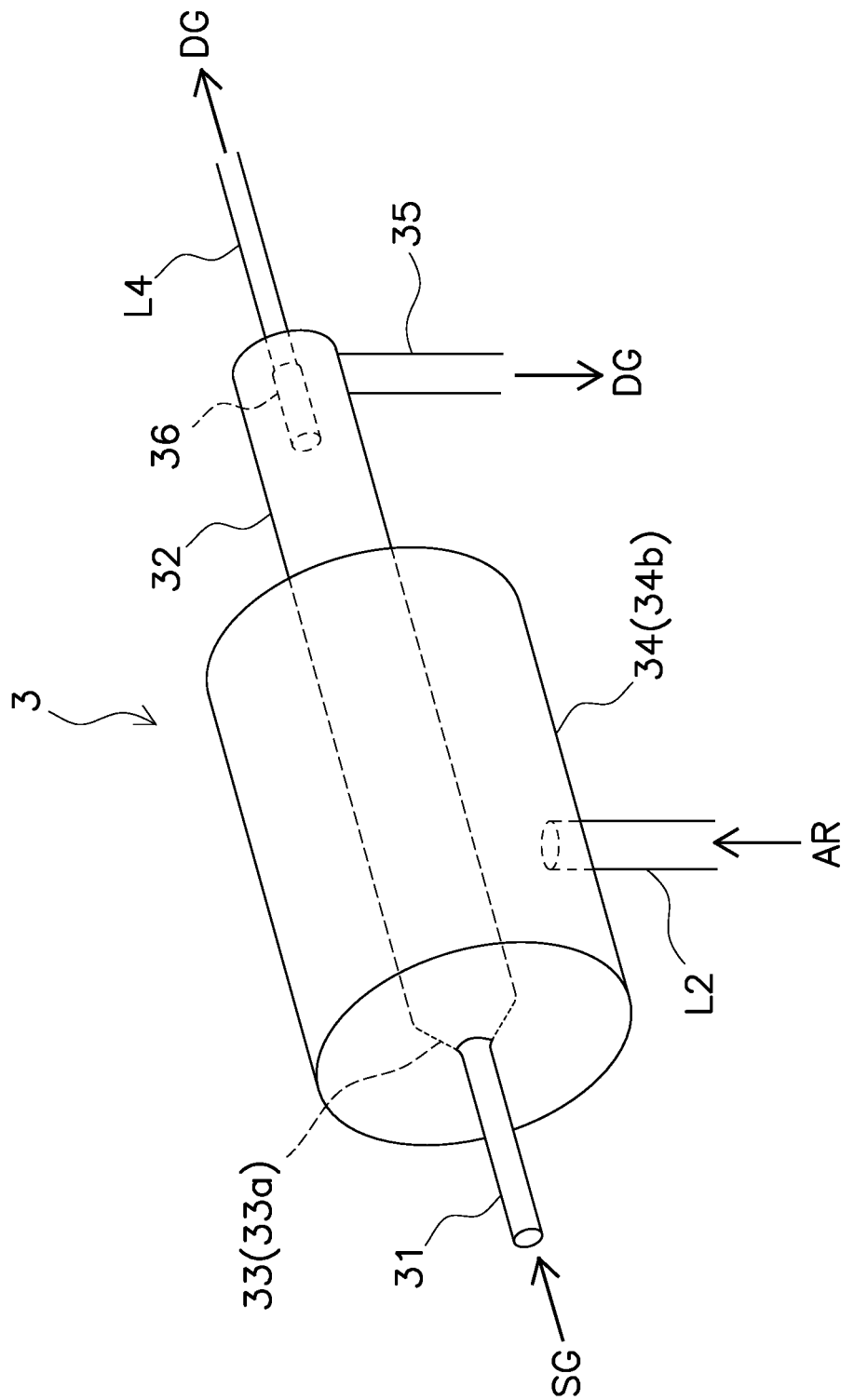
FIG. 2 is a perspective view of a diluter according to a first embodiment.
Figure 3:
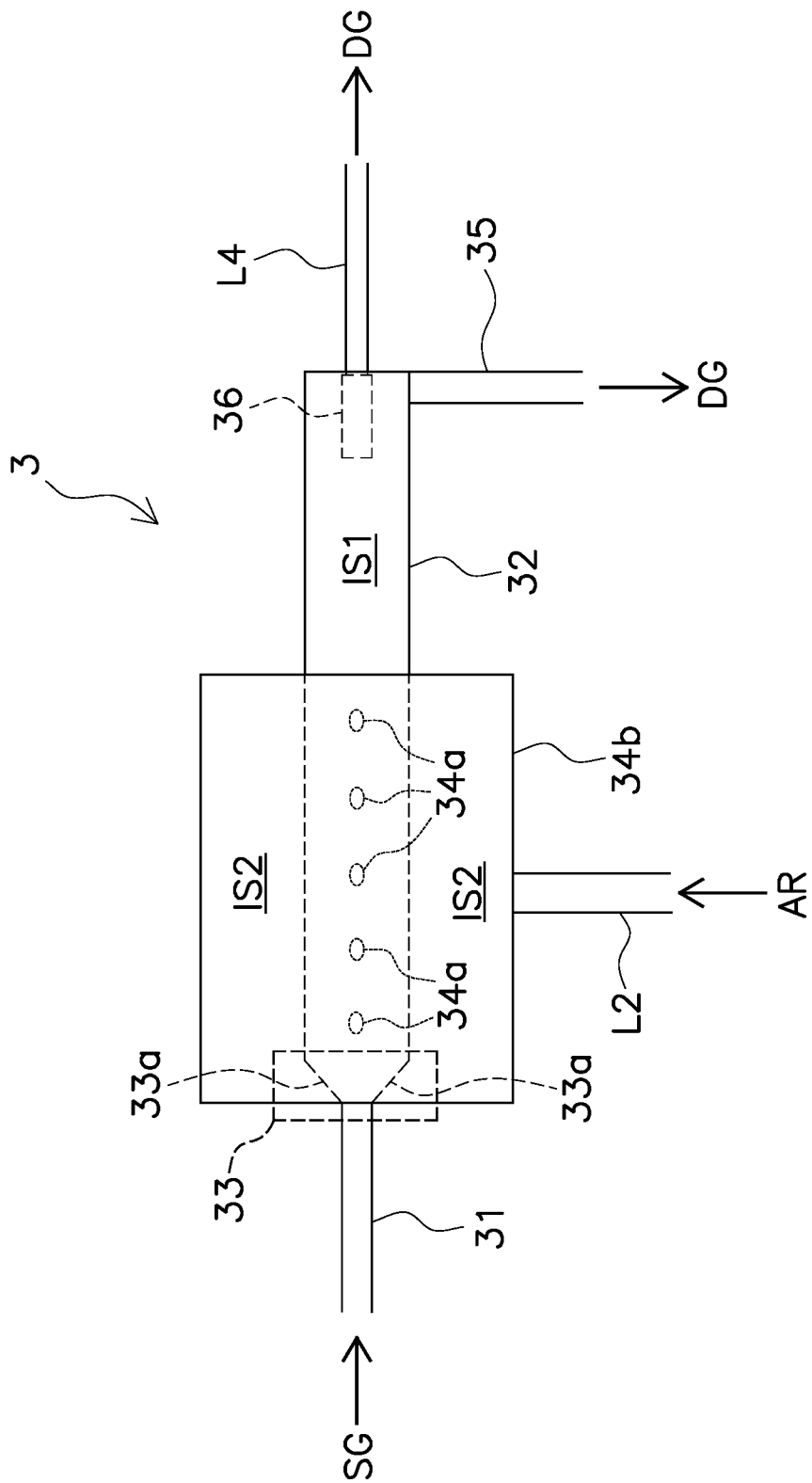
FIG. 3 is a side view of the diluter according to the first embodiment.
Figure 4:
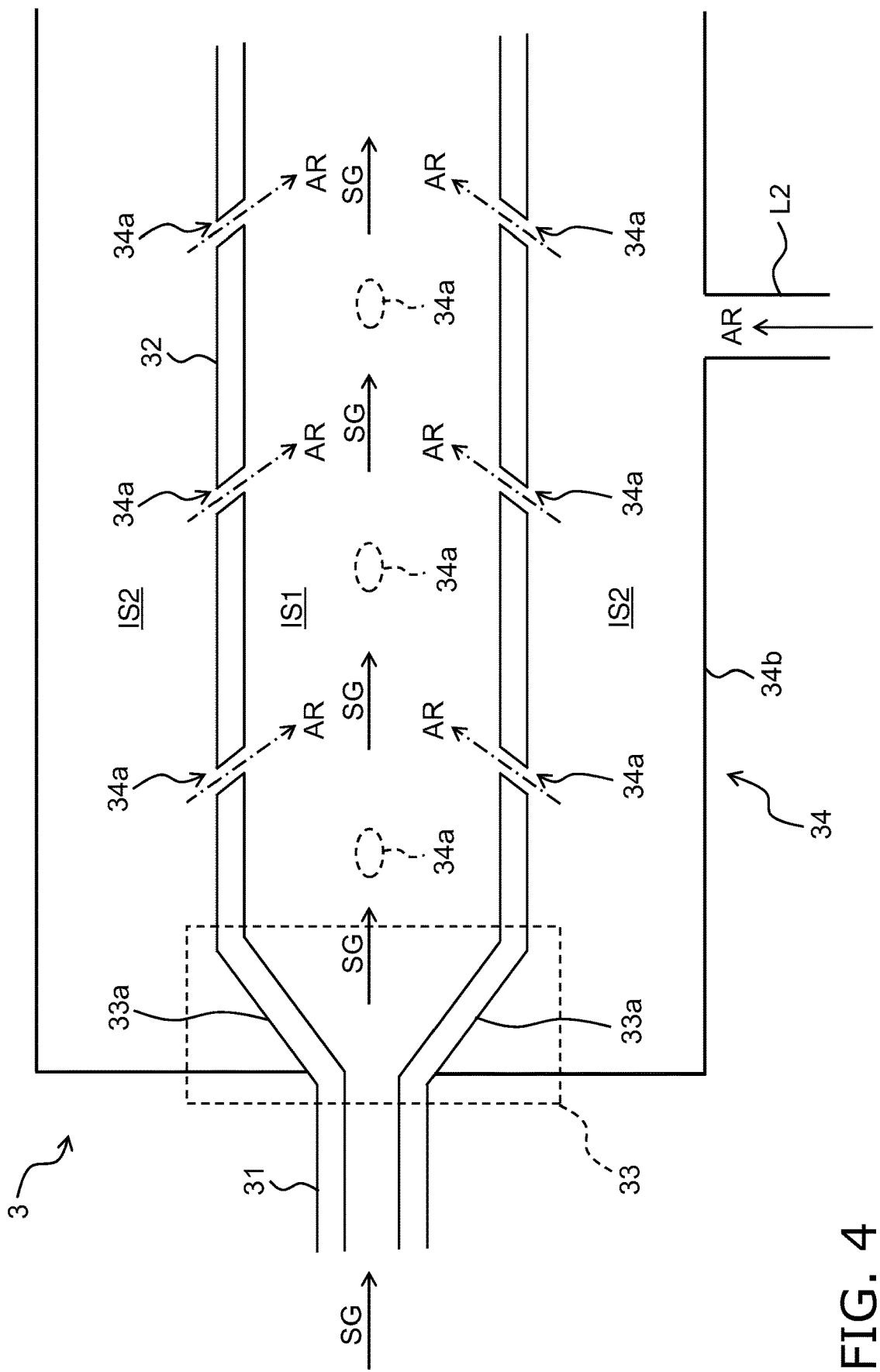
FIG. 4 is a cross-sectional view in a length direction of the diluter according to the first embodiment.
Figure 5A:
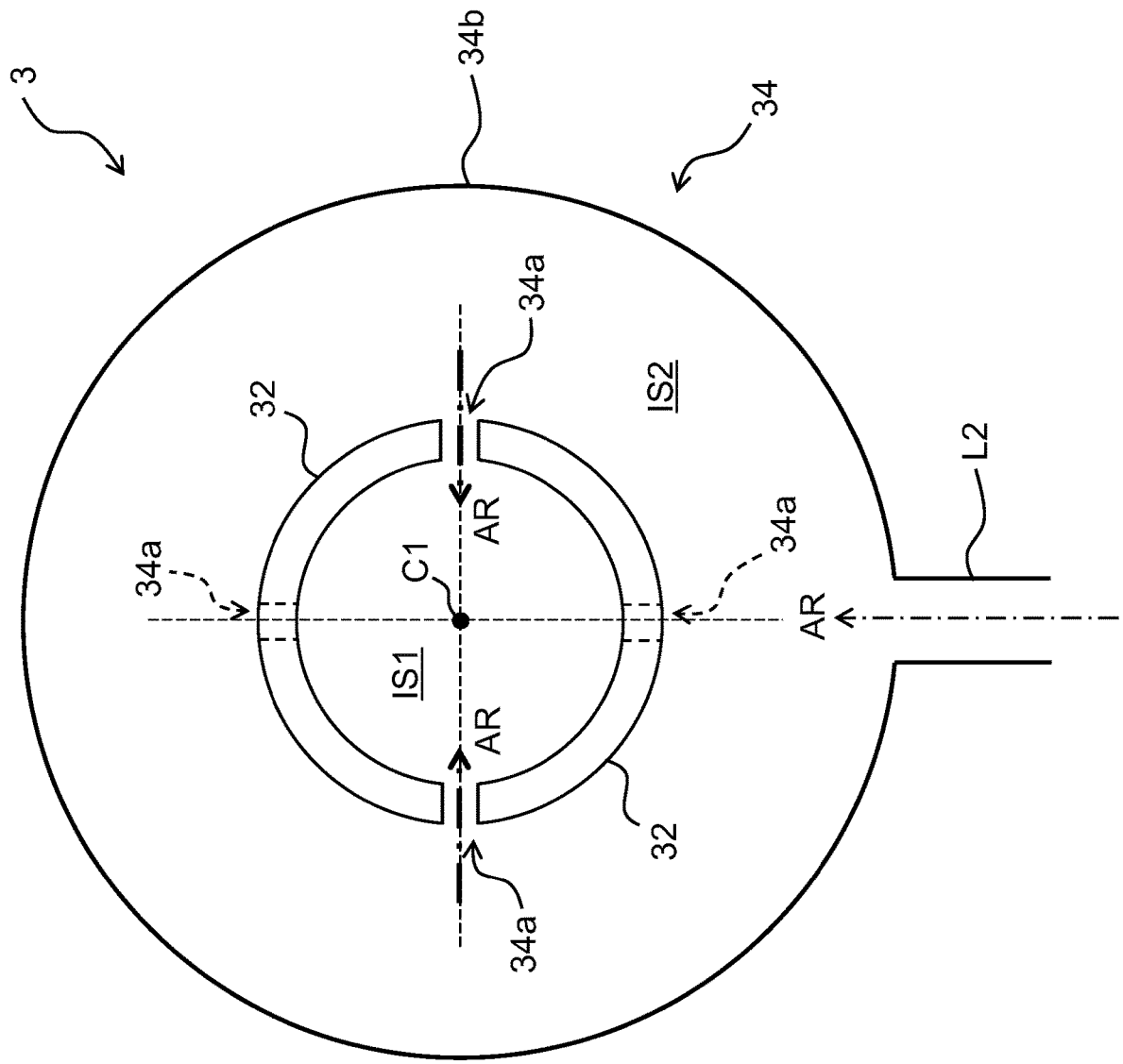
FIG. 5A is a cross-sectional view in a radial direction of the diluter, at a part where introduction ports are disposed in a left and right direction, according to the first embodiment.
Figure 5B:
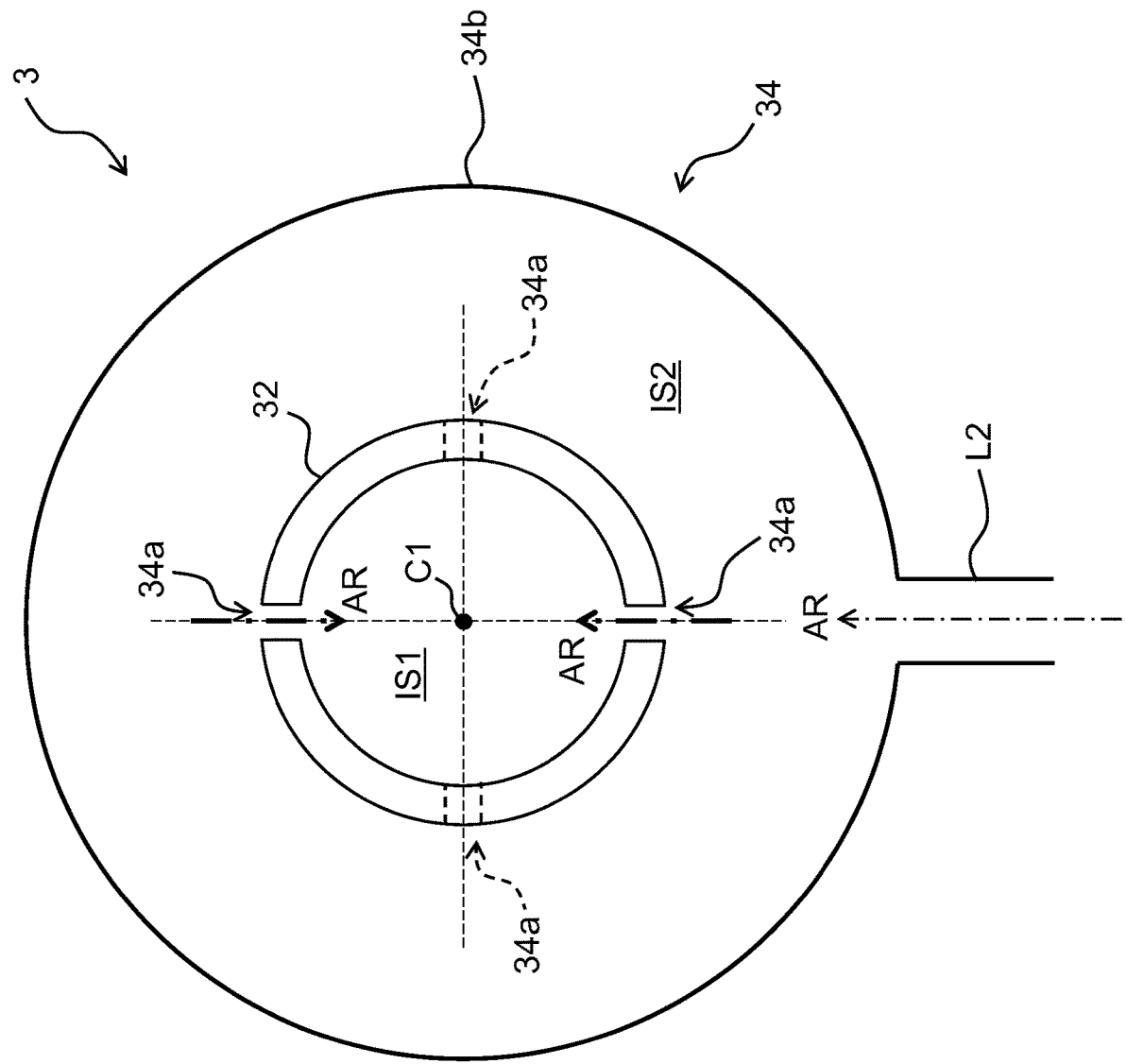
FIG. 5B is a cross-sectional view in the radial direction of the diluter, at a part where the introduction ports are disposed in an up and down direction, according to the first embodiment.

Hereinafter, the diluter 3 is described in detail, which realizes a function of diluting the particulate matter FP contained in the sample gas SG with the dilution gas AR in the analysis system 100 described above. First, with reference to FIGS. 2 to 5B, a specific structure of the diluter 3 is described. FIG. 2 is a perspective view of the diluter according to the first embodiment. FIG. 3 is a side view of the diluter according to the first embodiment. FIG. 4 is a cross-sectional view in a length direction of the diluter according to the first embodiment. FIG. 5A is a cross-sectional view of the diluter according to the first embodiment, in a radial direction at a part where introduction ports are disposed in a left and right direction. FIG. 5B is a cross-sectional view of the diluter according to the first embodiment, in the radial direction at a part where the introduction ports are disposed in an up and down direction.

The diluter 3 includes an inflow portion 31. The inflow portion 31 allows the sample gas SG sampled by the sampling probe 1 to flow into a mixing portion 32. Specifically, the inflow portion 31 has one end connected to the sampling probe 1 via the first gas line L1 and the other end connected to a connection portion 33. The inflow portion 31 allows the sample gas SG to flow into an internal space IS1 of the mixing portion 32 by suction powers of the first pump P1 and the second pump P2.

The diluter 3 includes the mixing portion 32. The mixing portion 32 is a cylindrical member having the internal space IS1. In the internal space IS1 of the mixing portion 32, the sample gas SG flowing in from the inflow portion 31 and the dilution gas AR are mixed to generate the diluted sample gas DG in which concentration of the particulate matter FP is reduced to less than that in the sample gas SG. As illustrated in FIGS. 2 to 5B, the mixing portion 32 has an inner diameter (i.e. a diameter of the internal space IS1) larger than that of the inflow portion 31.

The diluter 3 includes the connection portion 33. The connection portion 33 connects the inflow portion 31 and the mixing portion 32. As the mixing portion 32 has the inner diameter larger than that of the inflow portion 31, the connection portion 33 has a first tapered part 33a whose inner diameter gradually increases from a side connected to the inflow portion 31 toward a side connected to the mixing portion 32.

As the inner diameter of the first tapered part 33a gradually increases from the inflow portion 31 to the mixing portion 32, accumulation of the particulate matter FP on a bottom of the mixing portion 32 can be prevented.

It should be noted that a taper angle of the first tapered part 33a (an inclination angle of the side wall of the first tapered part 33a with respect to an elongation direction of the inflow portion 31) is preferably set to an appropriate angle. If the taper angle is excessively large, the inner diameter increases rapidly from the inflow portion 31 to the mixing portion 32, the function as the tapered part cannot be sufficiently performed. For instance, if the taper angle described above is excessively large, a part of the particulate matter FP contained in the sample gas SG flowing in from the inflow portion 31 is accumulated on a bottom or the like of the first tapered part 33a. On the contrary, if the taper angle is excessively small, the sample gas SG is not appropriately dispersed in the internal space IS1 of the mixing portion 32.

By setting an appropriate value for the taper angle described above, the sample gas SG is dispersed in an inner diameter direction, and accumulation of the particulate matter FP on the bottom or the like of the first tapered part 33a can be suppressed.

The diluter 3 includes an introduction portion 34. The introduction portion 34 introduces the dilution gas AR to be mixed with the sample gas SG to the internal space IS1 of the mixing portion 32. In this embodiment, the introduction portion 34 introduces the dilution gas AR from a plurality of positions in the length direction of the mixing portion 32 on a downstream side of the connection portion 33 in an inflow direction of the sample gas SG (a solid-line arrow direction in FIGS. 2 to 5B). As a specific structure, the introduction portion 34 includes a plurality of introduction ports 34a, and a dilution gas filling portion 34b.

As illustrated in FIG. 4, the plurality of (in this embodiment, five) introduction ports 34a are disposed along the length direction of the mixing portion 32 (i.e. the inflow direction of the sample gas SG) on the downstream side in the inflow direction of the sample gas SG. As illustrated in FIGS. 5A and 5B, one of the plurality of introduction ports 34a is disposed at a position point-symmetric to another one of the plurality of introduction ports 34a with respect to a center C1 of the cross section of the mixing portion 32. In this embodiment, two introduction ports 34a are disposed to face each other in the left and right direction (FIG. 5A), and two introduction ports 34a are disposed to face each other in the up and down direction (FIG. 5B).

In addition, in this embodiment, each of the plurality of introduction ports 34a is an opening that is formed to penetrate the side wall of the mixing portion 32 in a direction diagonal to the length direction of the mixing portion 32 (the inflow direction of the sample gas SG).

Further, as illustrated in FIG. 4, in this embodiment, pairs of the two introduction ports 34a facing in the left and right direction and pairs of the two introduction ports 34a facing in the up and down direction are alternately arranged at the same interval in the length direction of the mixing portion 32. In this way, a flow of the particulate matter FP along a gas flow in the left and right direction (horizontal direction) and that along a gas flow in the up and down direction (vertical direction) can be generated. As a result, it is possible to prevent the particulate matter FP from being concentrated to a specific position of the internal space IS1, such as the particulate matters FP are concentrated to the center of the internal space IS1 due to the flow of the dilution gas AR introduced through the introduction port 34a, for example, thus the particulate matter FP can be dispersed well in the internal space IS1.

The dilution gas filling portion 34b is a hollow member that houses a part of the length direction of the mixing portion 32 (and the connection portion 33) (a part where the plurality of introduction ports 34a are formed), in a nesting manner and in a gas tight state with a rubber member such as an O-ring in the gap between the dilution gas filling portion 34b and the mixing portion 32 (or the connection portion 33). As the dilution gas filling portion 34b is the hollow member, a dilution gas filling space IS2 is formed between the side wall (inner wall) of the dilution gas filling portion 34b and the side wall (outer wall) of the mixing portion 32.

The dilution gas filling space IS2 is connected to the feeding device 7 via the second gas line L2, and the dilution gas AR fed from the feeding device 7 is filled with a pressure higher than that of the internal space IS1 of the mixing portion 32.

As the plurality of introduction ports 34a are formed to penetrate the side wall of the mixing portion 32, the dilution gas filling space IS2 is connected to the internal space IS1 of the mixing portion 32 through the plurality of introduction ports 34a. In this way, the dilution gas AR filled in the dilution gas filling space IS2 is introduced into the internal space IS1 of the mixing portion 32 via the plurality of introduction ports 34a.

In this way, with the structure in which the dilution gas AR filled in the dilution gas filling space IS2 is introduced into the internal space IS1 of the mixing portion 32 through the plurality of introduction ports 34a, the dilution gas AR can be introduced uniformly from the plurality of introduction ports 34a. It is because, in the dilution gas filling space IS2, the dilution gas AR is filled with the same pressure without depending on a position in the dilution gas filling space IS2.

It should be noted that the dilution gas filling portion 34b can be detached from and attached to the mixing portion 32 (and the connection portion 33). In this way, for example, it is possible to detach the dilution gas filling portion 34b from the mixing portion 32 so as to check the state of the mixing portion 32.

The introduction portion 34 having the structure described above can produce the following effect.

First, as the plurality of introduction ports 34a are disposed on the downstream side of the first tapered part 33a of the connection portion 33 in the inflow direction of the sample gas SG, the dilution gas AR can be introduced into the internal space IS1 of the mixing portion 32 after the sample gas SG is introduced into the internal space of the first tapered part 33a. As a result, even if the particulate matter FP contained in the sample gas SG is heavy, the particulate matter can be uniformly dispersed in the internal space IS1 of the mixing portion 32, and the particulate matter FP contained in the sample gas SG can be uniformly diluted.

Second, as the plurality of introduction ports 34a are arranged along the inflow direction of the sample gas SG, the dilution gas AR can be introduced from a plurality of positions along the inflow direction of the sample gas SG, and hence the sample gas SG and the dilution gas AR can be uniformly mixed.

Third, as one of the plurality of introduction ports 34a is disposed at a position point-symmetric to another one of the plurality of introduction ports 34a with respect to the center C1 of the cross section of the mixing portion 32, the following effect can be obtained.

Specifically, the dilution gas AR introduced from one introduction port 34a collides with the dilution gas AR introduced from another introduction port 34a that is point-symmetric to the one introduction port 34a, at the center and its vicinity of the cross section of the mixing portion 32, thus the gas in the mixing portion 32 can be prevented from contacting with the inner wall surface of the mixing portion 32 and that the gas flow in the mixing portion 32 can be stabilized. As a result, dispersion of the particulate matter in the mixing portion 32 can be stabilized. Further, as contacts of the gas in the mixing portion 32 with the inner wall surface are reduced, a loss of the particulate matter due to adhesion of the same to the inner wall surface can also be suppressed.

Fourth, as pairs of the two introduction ports 34a facing in the left and right direction and pairs of the two introduction ports 34a facing in the up and down direction are alternately arranged at the same interval in the length direction of the mixing portion 32, it is possible to prevent a bias of the particulate matter FP to a specific position of the internal space IS1, thus the particulate matter FP can be dispersed well in the internal space IS1.

Fifth, as each of the plurality of introduction ports 34a is an opening formed diagonally to the inflow direction of the sample gas SG, the dilution gas AR can be introduced into the internal space IS1 of the mixing portion 32 in a direction diagonal to the inflow direction of the sample gas SG (in the direction shown by dot and dashed line arrows in FIG. 4). As shown in the simulation result described later, by introducing the dilution gas AR in a direction diagonal to the inflow direction of the sample gas SG, the particulate matter FP can be dispersed more uniformly in the internal space IS1 of the mixing portion 32 with little influence of the flow rate of the dilution gas AR.

The diluter 3 includes a discharge portion 35. The discharge portion 35 is disposed most downstream in the inflow direction of the sample gas SG in the mixing portion 32, to discharge, out of the diluted sample gas DG generated in the internal space IS1 of the mixing portion 32, a part that is not sampled by the analysis device 5, to the outside.

The discharge portion 35 is connected to the first pump P1 via the third gas line L3, the filter FI, the first flow rate adjuster FC1, the three-way valve V, and the first buffer tank BT1, to suck the diluted sample gas DG in the internal space IS1 of the mixing portion 32 by the suction power of the first pump P1, and to discharge the same to the outside. The suction rate of the diluted sample gas DG can be adjusted by the first flow rate adjuster FC1.

The diluter 3 includes a sampling portion 36. The sampling portion 36 is disposed most downstream in the inflow direction of the sample gas SG in the mixing portion 32, to sample the diluted sample gas DG from the internal space IS1 and to supply the same to the analysis device 5.

The sampling portion 36 is connected to the second pump P2 via the fifth gas line L5, the second buffer tank BT2, and the second flow rate adjuster FC2. The sampling portion 36 sucks the diluted sample gas DG in the internal space IS1 of the mixing portion 32 by the suction power of the second pump P2, and samples the same. A sampling rate of the diluted sample gas DG (a feed rate to the analysis device 5) can be adjusted by the second flow rate adjuster FC2.

In the diluter 3, the sampling portion 36 is disposed upstream of the most downstream side wall of the mixing portion 32 and upstream of the discharge portion 35.

In this way, for example, the particulate matter FP adhered to the most downstream side wall of the mixing portion 32 can be prevented from mixing the diluted sample gas DG to be sampled, and the diluted sample gas DG can be prevented from being sampled at a position affected by suction by the discharge portion 35. As a result, the sampling portion 36 disposed at the position described above can sample the diluted sample gas DG in the state where the particulate matter FP is uniformly dispersed in the internal space IS1.

In addition, a ratio S1/S2 between a cross-sectional area S1 of the sampling portion 36 at an opening part where the diluted sample gas DG flows, and a cross-sectional area S2 of the internal space IS1 at the position where the sampling portion 36 is disposed, is determined such that a flow velocity of the diluted sample gas DG in the sampling portion 36 is more than that in the internal space IS1 of the mixing portion 32.

Specifically, the ratio S1/S2 between the cross-sectional areas described above is set to less than a ratio F1/F2 between a flow rate F1 of the diluted sample gas DG in the sampling portion 36 (a flow rate set by the second flow rate adjuster FC2) and a flow rate F2 of the diluted sample gas DG in the internal space IS1 (a flow rate set by the first flow rate adjuster FC1).

As the flow velocity of the diluted sample gas DG in the sampling portion 36 is set to more than that in the internal space IS1 of the mixing portion 32, a dispersed state of the particulate matter FP in a vicinity of the position where the sampling portion 36 is disposed can be substantially the same as that in the internal space IS1 of the mixing portion 32. As a result, the sampling portion 36 can sample the diluted sample gas DG in the state where the particulate matter FP is uniformly dispersed.

(2-2) Simulation

In order to check effects of the dilution (dispersion) of the particulate matter FP contained in the sample gas SG by the diluter 3 having the structure described above, a simulation based on a theoretical calculation was performed using a hypothetic condition close to an actual situation. Hereinafter, a result of this simulation is described.

In this simulation, the particulate matter FP was regarded as spherical particles having a particle size of 50 μm and a (average) density of 2.3 g/cm$^3$. As the particulate matter FP having an average density of 2.3 g/cm$^3$, for example, there are particles whose main component is silica (silicon dioxide or $SiO_2$), alumina (aluminum oxide or $Al_2O_3$), or a mixture thereof (e.g. particles of coal ash).

In addition, a sampling flow velocity of the diluted sample gas DG by the sampling portion 36 was fixed to 70 m/min, while an introduction flow velocity of the dilution gas AR in the internal space IS1 by the introduction portion 34 and a discharge flow velocity of the diluted sample gas DG in the internal space IS1 by the discharge portion 35 were changed within a range of 64 to 130 m/min, so as to simulate the dispersed state of the particulate matter FP in the internal space IS1 of the mixing portion 32.

It should be noted that, as described above, an inflow rate of the sample gas SG from the inflow portion 31 is determined from an introduction flow rate of the dilution gas AR by the introduction portion 34, a discharge flow rate of the diluted sample gas DG by the discharge portion 35 (the suction rate of the first pump P1), and a sampling flow rate of the diluted sample gas DG by the sampling portion 36 (the suction rate of the second pump P2).

Therefore, when the sampling flow rate of the diluted sample gas DG is fixed and the introduction flow rate of the dilution gas AR is set equal to the discharge flow rate of the diluted sample gas DG, the inflow rate of the sample gas SG from the inflow portion 31 is the same as the sampling flow rate of the diluted sample gas DG.

Figure 6:
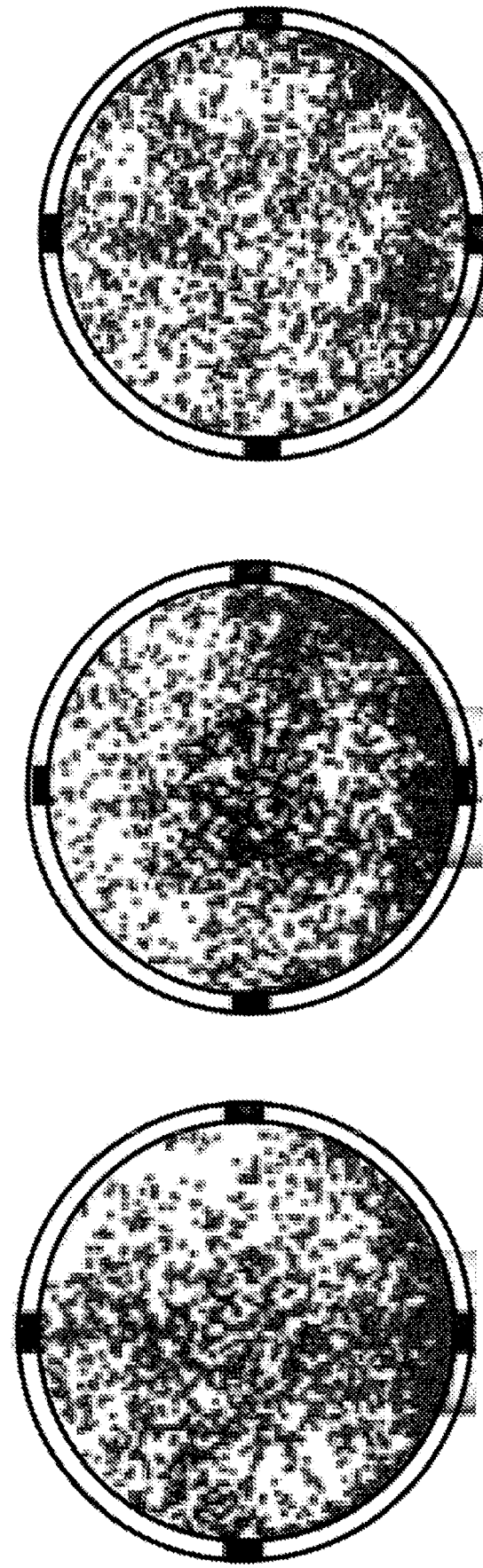
FIG. 6 is a diagram illustrating a simulation result of a dispersed state of the particulate matter in the internal space of the mixing portion.

FIG. 6 illustrates the simulation result of the dispersed state of the particulate matter FP in the internal space IS1 of the mixing portion 32 when using the conditions described above. FIG. 6 is a diagram illustrating the simulation result of the dispersed state of the particulate matter in the internal space of the mixing portion. In FIG. 6, the outer one of the concentric circles is the side wall of the mixing portion 32, inside of which is the internal space IS1 of the mixing portion 32, and the particles in the space are particulate matter FP.

As illustrated in FIG. 6, when the introduction flow velocity of the dilution gas AR in the internal space IS1 is changed, the diluter 3 in this embodiment can uniformly disperse the particulate matter FP in the internal space IS1 of the mixing portion 32. In other words, even if the introduction flow rate of the dilution gas AR is small, the particulate matter FP contained in the sample gas SG can be uniformly diluted.

If the introduction flow velocity (introduction flow rate) of the dilution gas AR can be reduced, the discharge flow velocity (discharge flow rate) of the diluted sample gas DG can also be reduced simultaneously. Therefore, using the diluter 3 of this embodiment for the analysis system 100, it is not necessary to use a high flow rate pump as the first pump P1 connected to the discharge portion 35, and hence the analysis system 100 can be made less expensive.

(3) Specific Structure of Analysis Device

Figure 7:
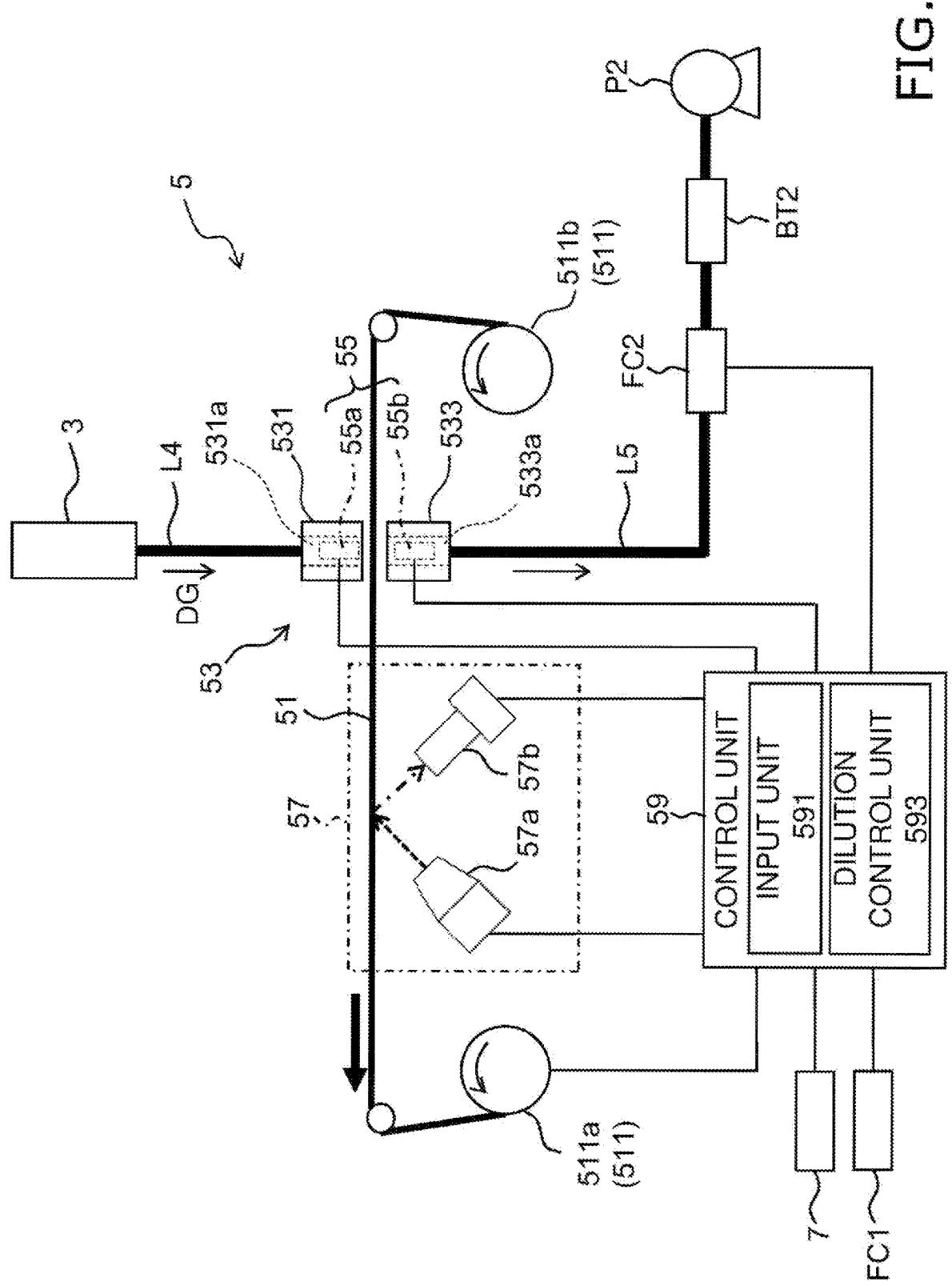
FIG. 7 is a diagram illustrating a specific structure of an analysis device.

Next, with reference to FIG. 7, a specific structure of the analysis device 5 provided to the analysis system 100 of this embodiment is described. FIG. 7 is a diagram illustrating a specific structure of the analysis device. The analysis device 5 is a device that collects the particulate matter FP contained in the diluted sample gas DG generated by the diluter 3 to the collection filter, and performs various analysis (mass concentration, content analysis) of the particulate matter FP collected by the collection filter.

Specifically, the analysis device 5 includes the collection filter 51, a collection unit 53, a collected amount measuring unit 55, a component analyzing unit 57, and a control unit 59.

The collection filter 51 is, for example, a tape-like member including a collection layer made of porous fluororesin-based material having pores capable of collecting the particulate matter FP, and the collection layer is laminated on a reinforcement layer made of nonwoven fabric of polymer material (such as polyethylene).

With the structure described above, the collection filter 51 allows the gas flow through the thickness direction of the collection filter 51, and the strength thereof can be improved. In addition, the collection filter 51 can be antistatic. As a result, the collected particulate matter can be prevented from being dispersed by electrostatic repulsion and getting out of a collecting region.

It should be noted that as the collection filter 51, for example, other filters such as a single layered glass filter or a single layered fluororesin-based material filter can be used.

In addition, the collection filter 51 can be moved in the length direction by a moving unit 511. The moving unit 511 includes a take-up reel 511a that is connected to one end in the length direction of the collection filter 51 and is rotated by a motor (not shown) or the like to take up the collection filter 51, and a feed reel 511b connected to the other end in the length direction of the collection filter 51 that is wound around the feed reel 511b. The moving unit 511 can move the collection filter 51 in the length direction (the thick arrow direction in FIG. 7), by rotating the take-up reel 511a so that the collection filter 51 is fed from the feed reel 511b and is taken up around the take-up reel 511a.

The collection unit 53 is disposed to the position corresponding to a predetermined position in the length direction of the collection filter 51, to sample the diluted sample gas DG from the diluter 3. The collection unit 53 allows the collection filter 51 to collect the particulate matter FP contained in the sampled diluted sample gas DG.

Specifically, the collection unit 53 samples the diluted sample gas DG from the diluter 3 by the suction power of the second pump P2. The sampled diluted sample gas DG is discharged from a discharging portion 531 by the suction power of the second pump P2.

During a period while the diluted sample gas DG discharged from the discharging portion 531 passes through the collection filter 51 and sucked to a sucking portion 533 by the suction power of the second pump P2, the particulate matter FP contained in the diluted sample gas DG is collected to the collection filter 51. After the particulate matter FP is removed from the diluted sample gas DG, the remaining gas is discharged to the outside by the second pump P2.

The collected amount measuring unit 55 measures collected amount of the particulate matter FP collected to the collection filter 51. Specifically, the collected amount measuring unit 55 includes a beta-ray source 55a (such as carbon-14 ($^{14}$C)) disposed at an opening part 531a of the discharging portion 531, and a beta-ray detector 55b (such as a photomultiplier having a scintillator) disposed at an opening part 533a of the sucking portion 533 so as to face the beta-ray source 55a.

The collected amount measuring unit 55 can measure the collected amount of the particulate matter FP as the mass concentration, based on beta-ray intensity detected by the beta-ray detector 55b after the beta-ray is emitted from the beta-ray source 55a and passes through the particulate matter FP collected to the collection filter 51.

The component analyzing unit 57 analyzes components contained in the particulate matter FP collected to the collection filter 51. As illustrated in FIG. 7, the component analyzing unit 57 of this embodiment is disposed at a position different from that of the collection unit 53 in the length direction of the collection filter 51. In other words, after the collection filter 51 that has collected the particulate matter FP is moved by the moving unit 511 to the position of the component analyzing unit 57, the component analyzing unit 57 performs the content analysis of the particulate matter FP collected by the collection filter 51.

In this way, as the component analyzing unit 57 is disposed at the position apart from the collection unit 53 and the collected amount measuring unit 55, the collection unit 53 collects the particulate matter FP to the collection filter 51 (measures the collected amount), while the content analysis of the particulate matter FP that has been collected before can be performed simultaneously.

In this embodiment, the component analyzing unit 57 irradiates the particulate matter FP collected to the collection filter 51 with X-rays generated from an X-ray source 57a (e.g. a device that irradiates an electron beam to a metal such as palladium to generate X-rays), and measures fluorescent X-rays generated from the particulate matter FP, using a detector 57b (such as a silicon semiconductor detector or a silicon drift detector), to perform identification of elements contained in the particulate matter FP and measurement of contents of the elements, as the content analysis.

The control unit 59 is a computer system including a central processing unit (CPU), a storage device (such as RAM, ROM, SSD, and HDD) (not shown), a display device (such as a liquid crystal display) (not shown), and various interfaces (not shown).

The control unit 59 controls individual portions of the analysis system 100, to perform the analysis of the particulate matter FP in the analysis system 100. The control unit 59 may realize a part or the whole of the control of the analysis system 100 by executing a program stored in the storage device described above.

The control unit 59 includes an input unit 591 and a dilution control unit 593.

The input unit 591 is an input device that sets various parameters in the analysis device 5 and/or the analysis system 100. The input unit 591 is, for example, an input device such as a keyboard, a mouse, or a touch panel.

The dilution control unit 593 controls the feeding device 7, the first flow rate adjuster FC1, and the second flow rate adjuster FC2, to control the dilution ratio of the particulate matter FP contained in the sample gas SG. It should be noted that the dilution ratio is expressed, for example, as a ratio between the inflow rate of the sample gas SG flowing in the diluter 3 and an introduction rate of the dilution gas AR to the diluter 3.

For instance, the dilution control unit 593 calculates the introduction rate of the dilution gas AR to be fed from the feeding device 7 to the diluter 3, the discharge flow rate of the diluted sample gas DG to the third gas line L3 (a flow rate to be set in the first flow rate adjuster FC1), the discharge flow rate of the diluted sample gas DG to the fourth gas line L4 (a flow rate to be set in the second flow rate adjuster FC2), from the inflow rate of the sample gas SG input by the input unit 591, the sampling flow rate of the diluted sample gas DG to the analysis device 5, and the dilution ratio, to set the calculated flow rates to the feeding device 7, the first flow rate adjuster FC1, and the second flow rate adjuster FC2.

It should be noted that some or all of the sampling rate of the sample gas SG, the sampling rate of the diluted sample gas DG to the analysis device 5, and the dilution ratio described above may be set in advance and are stored in a storage area of the storage device of the computer system constituting the control unit 59.

(4) Analysis Operation of Particulate Matter in Analysis System

Figure 8:
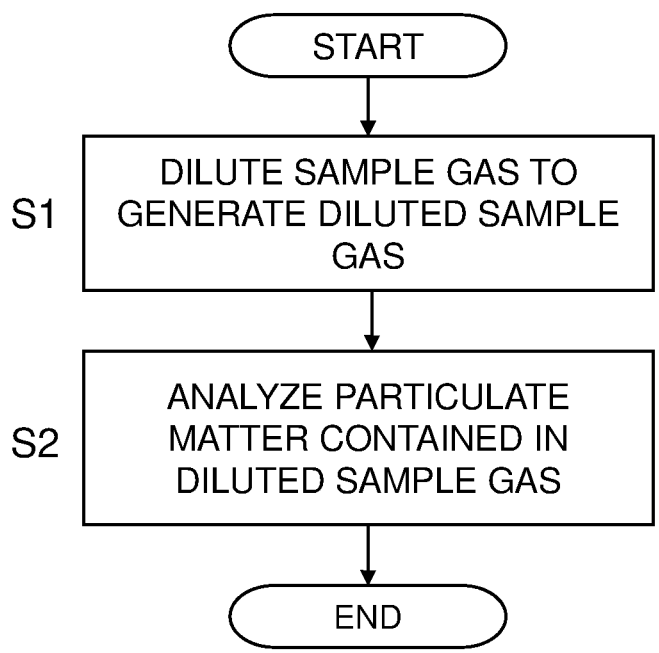
FIG. 8 is a flowchart illustrating an analysis operation of the particulate matter in the analysis system.

Hereinafter, with reference to FIG. 8, the analysis operation of the particulate matter FP in the analysis system 100 having the structure described above is described. FIG. 8 is a flowchart illustrating the analysis operation of the particulate matter in the analysis system.

When the analysis system 100 analyzes the particulate matter FP contained in the sample gas SG, it first mixes the sample gas SG with the dilution gas AR to generate the diluted sample gas DG in Step S1.

Specifically, the first pump P1 and the second pump P2 are operated, and the dilution gas AR is introduced from the feeding device 7 to the diluter 3. In this way, the dilution gas AR is introduced into the internal space IS1 of the mixing portion 32. In addition to this, the sample gas SG flowing in the flue FL passes through the sampling probe 1, the first gas line L1, and the inflow portion 31, and is introduced into the internal space IS1 of the mixing portion 32, at a flow rate determined by a difference between the introduction rate of the dilution gas AR and the gas flow rate of the third gas line L3 and the fourth gas line L4 adjusted by the first flow rate adjuster FC1 and the second flow rate adjuster FC2. When the dilution gas AR and the sample gas SG are introduced into the internal space IS1, these gases are mixed, and the particulate matter FP contained in the sample gas SG is diluted by the dilution gas AR, thus the diluted sample gas DG is generated.

After the diluted sample gas DG is generated, in Step S2, the analysis device 5 analyzes the particulate matter FP contained in the diluted sample gas DG generated in Step S1.

Specifically, the control unit 59 continues the collection of the particulate matter FP contained in the diluted sample gas DG, which is sampled from the diluter 3 by the suction power of the second pump P2, to the collection filter 51 for a predetermined period of time (e.g. 1 hour), while the collected amount measuring unit 55 measures the collected amount of the particulate matter FP to the collection filter 51.

After that, the control unit 59 controls the moving unit 511 to move the part of the collection filter 51 where the particulate matter FP is collected to the component analyzing unit 57. Further after that, the component analyzing unit 57 is controlled to perform the content analysis of the particulate matter FP, i.e. the identification of elements contained in the particulate matter FP and the measurement of contents of the elements.

It should be noted that the analysis device 5 performs the collection of the particulate matter FP contained in the diluted sample gas DG sampled from the diluter 3 by the collection unit 53 to the collection filter 51, while performing the content analysis described above. In this way, the analysis device 5 can simultaneously perform the collection of the particulate matter FP and the content analysis.

In the analysis device 5, the collection of the particulate matter FP by the collection unit 53 can be started or stopped, for example, by opening and closing a valve (not shown) disposed between the sucking portion 533 and the second pump P2, or by starting or stopping the suction by the second pump P2.

In addition, if the collected amount of the particulate matter FP to the collection filter 51 exceeds a predetermined amount, the analysis device 5 may stop the collection of the particulate matter FP to the collection filter 51 before the predetermined period of time described above elapses. In this way, breakage or the like of the collection filter 51 can be prevented.

(5) Summary

The structures of the analysis system 100 according to this embodiment are described above in detail. Hereinafter, the analysis system 100 of this embodiment including the diluter 3 and the analysis device 5 that are described above in detail is summarized below.

In the analysis system 100 of this embodiment, the diluter 3 can generate the diluted sample gas DG by uniformly diluting the particulate matter FP contained in the sample gas SG, and hence it is possible to suppress occurrence of clogging of the collection unit 53 (particularly, the opening part 531a of the discharging portion 531), when sampling the diluted sample gas DG and collecting the same to the collection filter 51 of the analysis device 5. As a result, in the analysis device 5, without causing a problem such as clogging, the particulate matter FP contained in the sample gas SG at a high concentration can be collected to the collection filter 51 continuously with a short period.

As the particulate matter FP contained in the sample gas SG at a high concentration can be collected to the collection filter 51 continuously with a short period, the analysis device 5 can sequentially and continuously analyze the particulate matter FP collected to the collection filter 51.

Therefore, for example, by regarding exhaust gas generated in various combustion processes (such as a thermal power plant or an iron manufacturing plant) as the sample gas SG, and by using the analysis system 100 of this embodiment to continuously analyze the particulate matter FP contained in the sample gas SG at a high concentration, it is possible, for example, to monitor temporal variation of combustion efficiency in the combustion process and/or to detect abnormality that has occurred in the combustion process.

In addition, in order that the collected amount measuring unit 55 accurately measures the collected amount (mass concentration) of the particulate matter FP collected to the collection filter 51 of the analysis device 5 using the beta-rays, it is necessary to slowly collect the particulate matter FP to the collection filter 51 and to take time in measuring the collected amount.

Therefore, as described in this embodiment, the particulate matter FP contained in the sample gas SG at a high concentration is diluted by the diluter 3 to generate the diluted sample gas DG, and the particulate matter FP contained in the diluted sample gas DG is collected to the collection filter 51. Thus, the particulate matter FP contained in the diluted sample gas DG is slowly collected to the collection filter 51, and the collected amount of the particulate matter FP can be accurately measured.

(6) Application Example 1 of Analysis System

Figure 9:
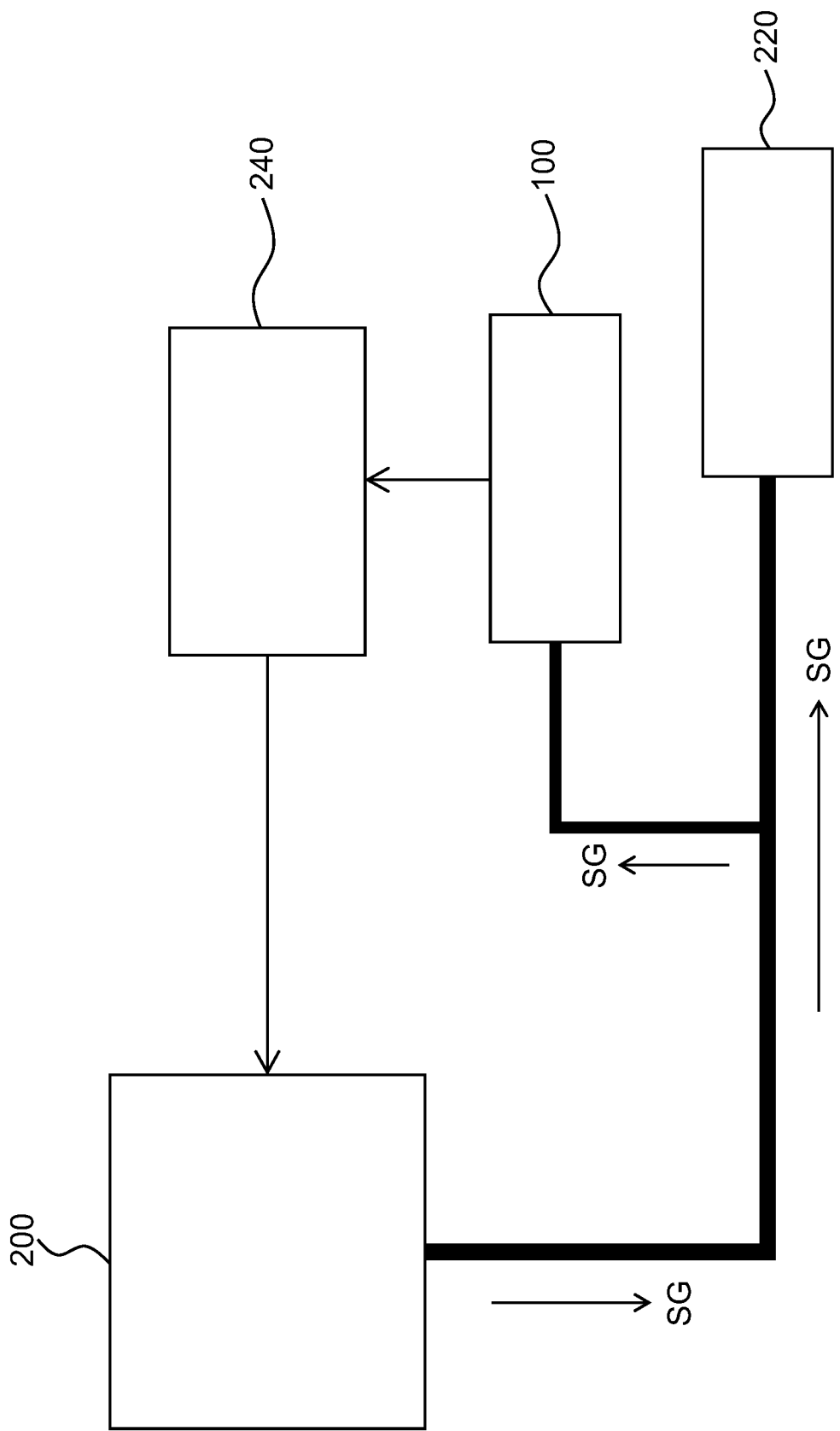
FIG. 9 is a diagram illustrating a structure of Example 1 of the analysis system.

Hereinafter, with reference to FIG. 9, an application example of the analysis system 100 described above is described. FIG. 9 is a diagram illustrating a structure of the Application Example 1 of the analysis system.

The application example illustrated in FIG. 9 is an example in which the analysis system 100 is applied to control of combustion of a boiler 200 for coal thermal power generation. The boiler 200 for coal thermal power generation uses coal as fuel, and hence gas containing coal ash is discharged from the boiler 200. Therefore, in the analysis system 100 of Application Example 1, the exhaust gas from the boiler 200 is regarded as the sample gas SG, and the coal ash is regarded as the particulate matter FP to be analyzed.

As illustrated in FIG. 9, the particulate matter FP contained in the gas discharged from the boiler 200 is collected by an electrostatic precipitator 220. The analysis system 100 samples the gas flowing in the flue from the boiler 200 to the electrostatic precipitator 220 as the sample gas SG.

In Application Example 1, the analysis system 100 performs analysis about carbon content amount in the particulate matter FP (coal ash) contained in the sample gas SG. The analysis system 100 outputs a control signal based on a result of the analysis about carbon content amount to a control panel 240 that controls combustion of the boiler 200.

The control panel 240 can control combustion of the boiler 200, for example, by controlling amount of coal fed to the boiler 200 based on the control signal from the analysis system 100. For instance, if an analysis result showing that a large amount of carbon is contained in the particulate matter FP is obtained, the control panel 240 determines that there are many embers of coal in the boiler 200, and performs control such as adjusting (decreasing) input amount of coal, adjusting (increasing) firepower of a burner in the boiler 200, or adjusting angle of the burner.

The analysis system 100 including the diluter 3 can dilute the particulate matter FP contained in a gas at a high concentration using the diluter 3, and hence it can be effectively applied to cases in which the gas discharged from the boiler 200 that generates a large quantity of coal ash is the sample gas SG as described in Application Example 1.

(7) Application Example 2 of Analysis System

Figure 10:
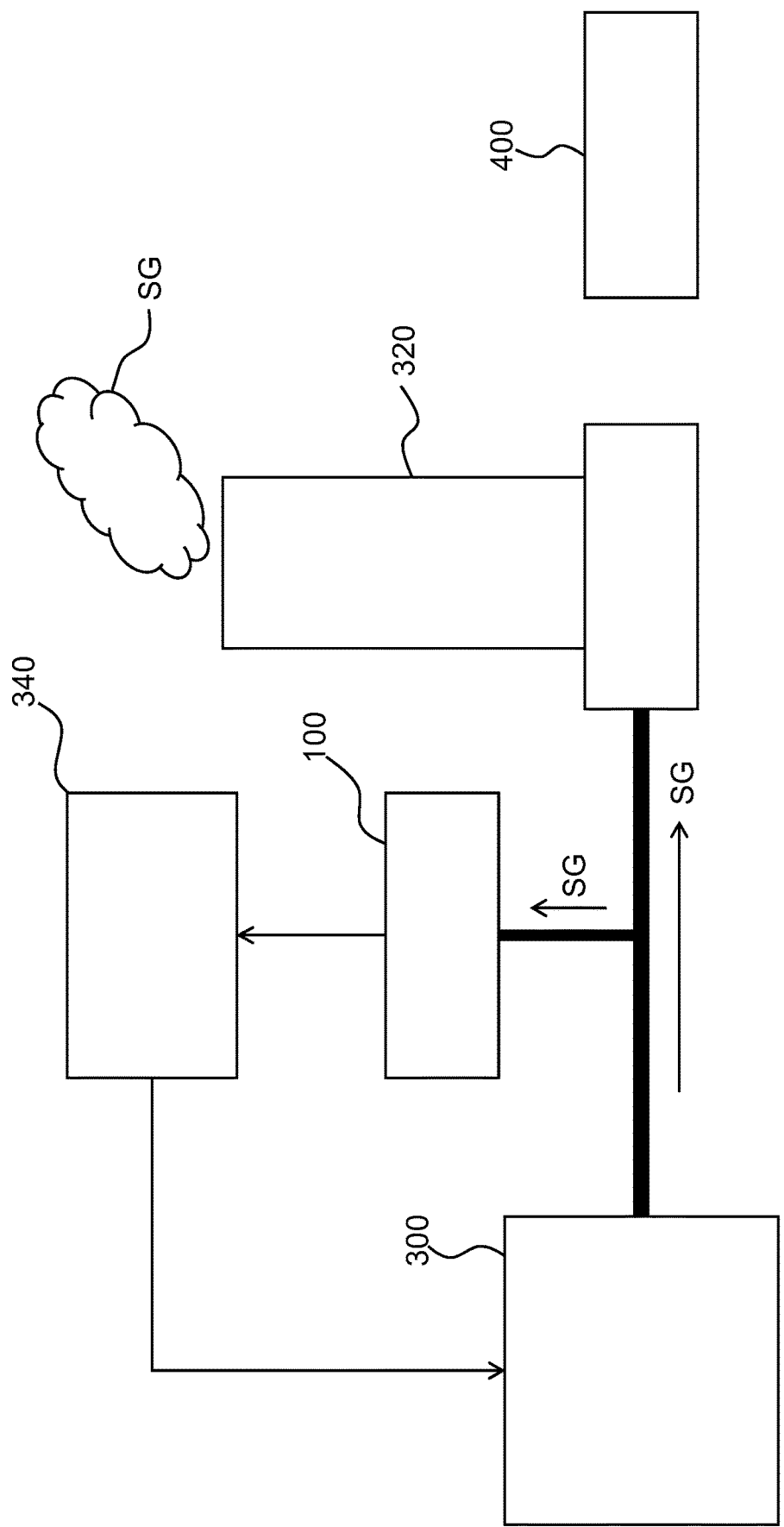
FIG. 10 is a diagram illustrating a structure of Example 2 of the analysis system.

Hereinafter, with reference to FIG. 10, another application example of the analysis system 100 is described. FIG. 10 is a diagram illustrating a structure of Application Example 2 of the analysis system.

The application example illustrated in FIG. 10 is aimed at using the analysis system 100 to protect environment about gas (particulate matter FP) discharged to atmosphere from a combustion plant 300 via a chimney 320. The combustion plant 300 may discharge gas containing a large quantity of the particulate matter FP. When such gas containing a large quantity of the particulate matter FP is discharged from the chimney 320 to atmosphere, the particulate matter FP may also fall in a region away from the combustion plant 300 (such as a region near an urban area).

Therefore, the analysis system 100 of Application Example 2 measures the particulate matter FP contained in the sample gas SG that is an exhaust gas from the combustion plant 300. As illustrated in FIG. 10, the analysis system 100 of Application Example 2 samples gas flowing in a flue from the combustion plant 300 to the chimney 320 as the sample gas SG.

In Application Example 2, the analysis system 100 performs the analysis about components contained in the particulate matter FP contained in the sample gas SG. In addition, a measurement device 400, which is disposed in a region away from the combustion plant 300 and can communicate with the analysis system 100, performs the analysis about components contained in the particulate matter FP falling in the region.

It should be noted that the measurement device 400 may be the analysis device 5 described above or may be another analysis device.

The analysis system 100 compares a result of the analysis about components contained in the particulate matter FP obtained by the analysis system 100 and that obtained by the measurement device 400, and determines whether or not there is a correlation between these results of the analysis. The correlation here means, for example, whether or not the same element is contained at the same ratio.

If there is a correlation between the result of the analysis by the analysis system 100 and that by the measurement device 400, the analysis system 100 determines that the particulate matter FP has flown to the region away from the combustion plant 300.

In this case, the analysis system 100 outputs a notification of necessity to suppress generation of the particulate matter FP, or a warning that the particulate matter FP has been generated excessively, to the control panel 340 that controls the combustion plant 300. Based on the notification or warning from the analysis system 100, the control panel 340 regulates combustion conditions or the like in the combustion plant 300, to perform control of suppressing generation of the particulate matter FP from the combustion plant 300.

The analysis system 100 including the diluter 3 can be effectively applied to cases in which gas discharged from the combustion plant 300 that can generate a large quantity of the particulate matter FP is the sample gas SG as described in Application Example 2, because the diluter 3 can dilute the particulate matter FP contained in the gas at a high concentration.

2. Second Embodiment

The diluter provided to the analysis system 100 may have a structure different from that of the diluter 3 described in the first embodiment. For instance, a diluter 3' according to a second embodiment may include an introduction portion 34' having a structure different from that of the introduction portion 34 provided to the diluter 3 of the first embodiment.

Figure 11:
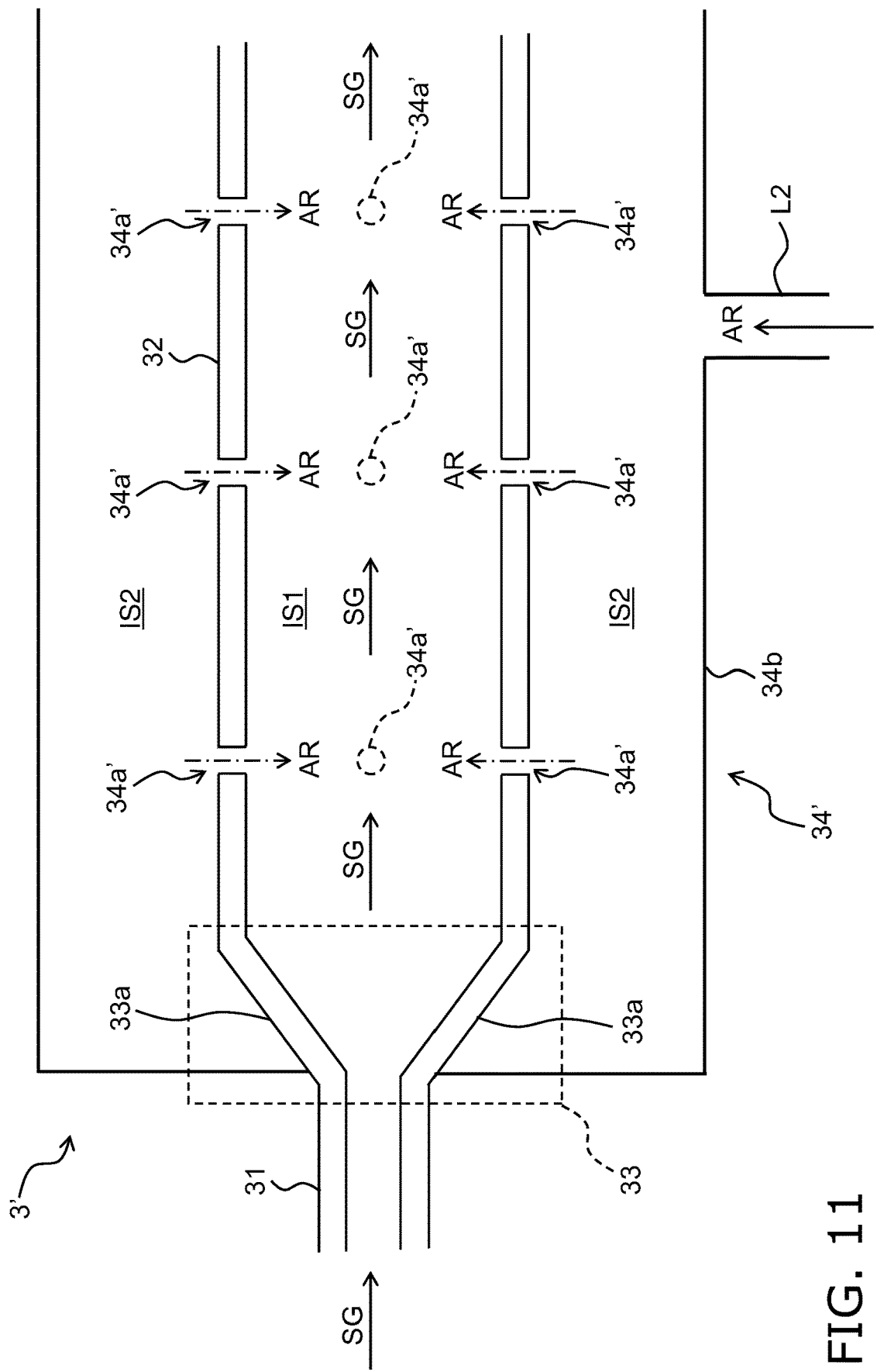
FIG. 11 is a cross-sectional view in the length direction of the diluter according to a second embodiment.

Specifically, as illustrated in FIG. 11, the introduction portion 34' of the second embodiment has openings formed perpendicular to the side wall of the mixing portion 32, as introduction ports 34a' that introduce the dilution gas AR. FIG. 11 is a cross-sectional view in the length direction of the diluter according to the second embodiment.

The introduction portion 34' having the introduction ports 34a', which are openings formed perpendicular to the side wall of the mixing portion 32, introduces the dilution gas AR perpendicular to the inflow direction of the sample gas SG into the internal space IS1 of the mixing portion 32.

As a result of performing the simulation described in the first embodiment for studying the dispersed state of the particulate matter FP, for the diluter 3' of the second embodiment, it was found that the particulate matter FP can be uniformly dispersed in the internal space IS1 of the mixing portion 32, by sufficiently increasing the introduction flow rate of the dilution gas AR, even in the case where the dilution gas AR is introduced perpendicular to the inflow direction of the sample gas SG.

In general, it is easier to form the opening perpendicular to the side wall of the mixing portion 32 than to form the opening diagonally to the same, and hence the structure of the diluter can be simpler in the former than the latter. Therefore, by adopting the structure in which the dilution gas AR is introduced perpendicular to the inflow direction of the sample gas SG into the internal space IS1 of the mixing portion 32, the diluter 3' of the second embodiment can make the structure of the introduction portion 34' simpler, while the particulate matter FP can be uniformly dispersed in the internal space IS1 of the mixing portion 32.

It should be noted that, in the second embodiment, only the structure of the diluter 3' (the shape of the introduction port 34a') is different, and other structures of the analysis system 100 are the same as those in the first embodiment. Therefore, the description of structural elements other than the introduction port 34a' of the diluter 3' is omitted.

3. Third Embodiment

The diluter provided to the analysis system 100 may have a structure different from that of the diluter 3 or 3' described in the first or second embodiment. For instance, a diluter 3" according to a third embodiment may have a structure in which the dilution gas AR is introduced from the first tapered part 33a of the connection portion 33.

Figure 12:
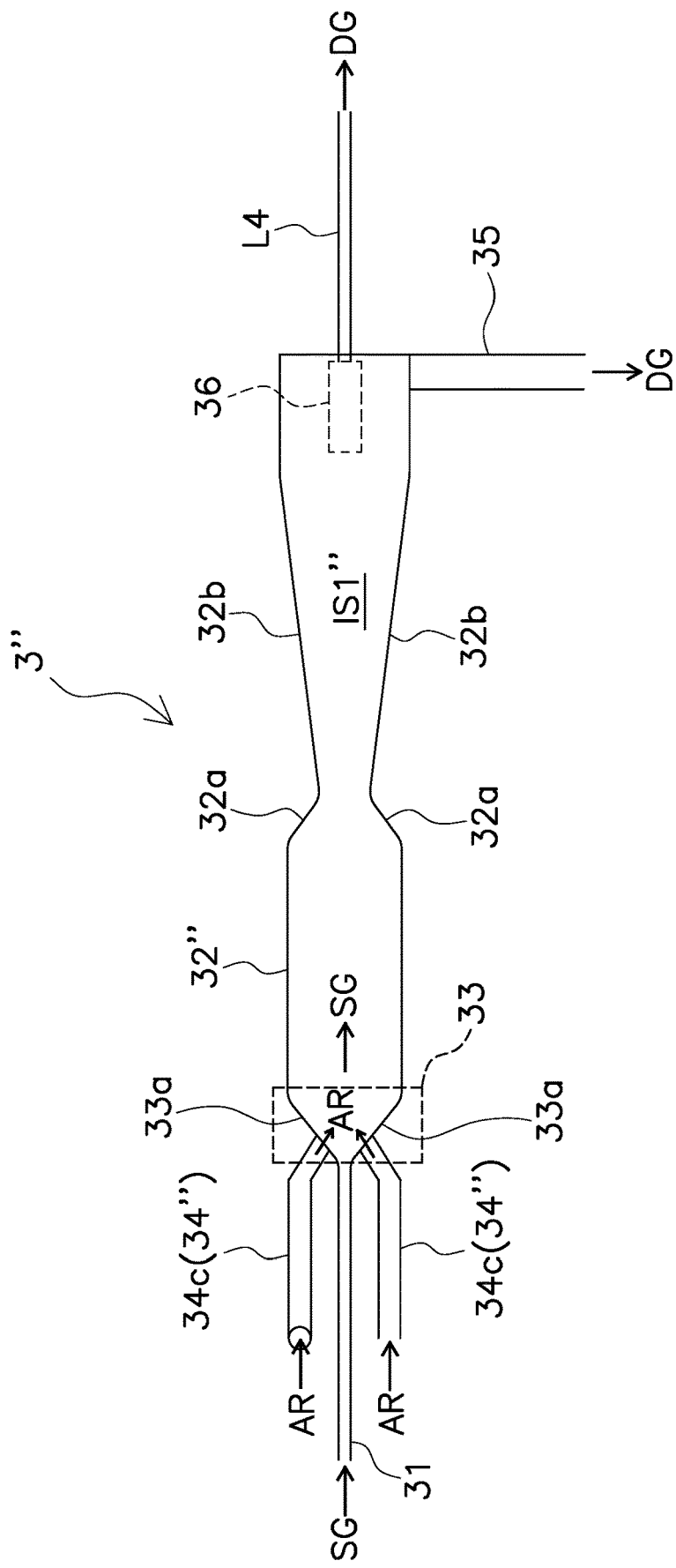
FIG. 12 is a side view of the diluter according to a third embodiment.
Figure 13:
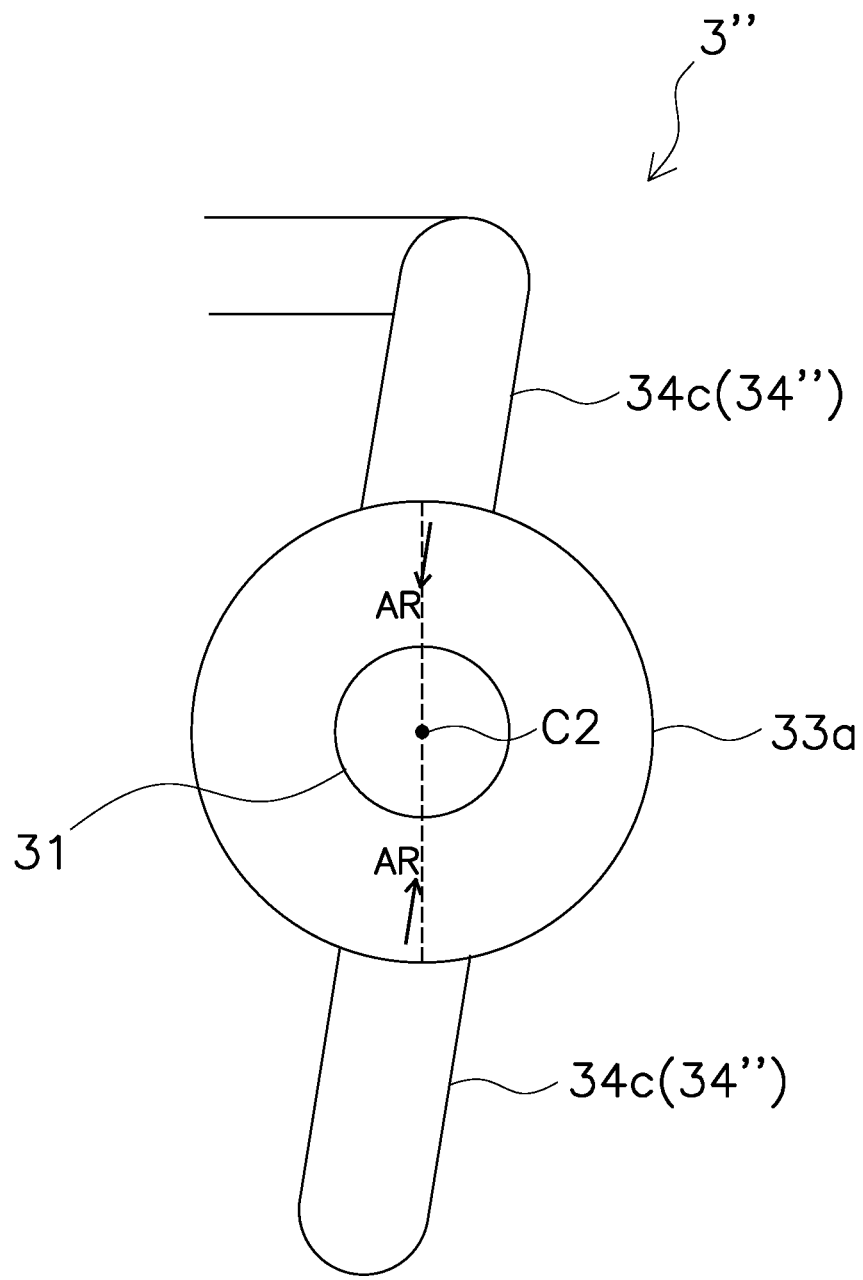
FIG. 13 is a cross-sectional view at a connection part between a first tapered part and an introduction portion of the diluter according to the third embodiment.

Specifically, as illustrated in FIGS. 12 and 13, an introduction portion 34" of the diluter 3" according to the third embodiment includes a plurality of introduction tubes 34c, each of which has one end connected to the first tapered part 33a at a position downstream of the position connected to the inflow portion 31 and the other end connected to the feeding device 7 via the second gas line L2. FIG. 12 is a side view of the diluter according to the third embodiment. FIG. 13 is a cross-sectional view of the diluter according to the third embodiment at the connection part between the first tapered part and the introduction portion.

The diluter 3" of the third embodiment is the same as the diluter 3 or 3' of the first or second embodiment in that the introduction tube 34c is disposed at the position downstream of the connection position between the connection portion 33 (the first tapered part 33a) and the inflow portion 31. Therefore, also in the diluter 3" of the third embodiment, the dilution gas AR is introduced after the sample gas SG is introduced into the internal space of the connection portion 33 (the first tapered part 33a), and hence the particulate matter FP can be uniformly dispersed in an internal space IS1" of a mixing portion 32".

On the other hand, as illustrated in FIG. 12, in the connection portion 33 (the first tapered part 33*a*), the introduction tube 34*c* is provided to the first tapered part 33*a* with a predetermined angle to an extension direction of the inflow portion 31. In addition, as illustrated in FIG. 13, the introduction tube 34*c* is provided to the first tapered part 33*a* with a predetermined angle to the vertical direction when viewing the connection portion 33 from the radial direction.

As the introduction tube 34*c* is disposed diagonally to the extension direction of the inflow portion 31 and to the vertical direction, the dilution gas AR is introduced in a direction diagonal to the inflow direction of the sample gas SG and to the vertical direction, so that a swirling flow of gas can be generated in the internal space IS1" of the mixing portion 32".

The swirling flow generated in the internal space IS1" of the mixing portion 32" can raise the particulate matter FP in the internal space IS1" of the mixing portion 32", and can uniformly disperse the particulate matter FP in the internal space IS1".

In addition, as illustrated in FIG. 13, one of the plurality of introduction tubes 34*c* is disposed at a position point-symmetric to another one of the plurality of introduction tubes 34*c* with respect to a center C2 of the cross section of the first tapered part 33*a*. In this embodiment, two introduction tubes 34*c* are disposed up and down on the side wall of the first tapered part 33*a* with spaces of 180 degrees in the circumferential direction.

Further, in the diluter 3" of the third embodiment, as illustrated in FIG. 12, the shape of the mixing portion 32" is different from the shape of the mixing portion 32 in the first or second embodiment. Specifically, the mixing portion 32" has a second tapered part 32*a* whose inner diameter decreases from an upstream side to a downstream side in the inflow direction of the sample gas SG, and a third tapered part 32*b* whose inner diameter increases from a side of the second tapered part 32*a* to the downstream side.

As the mixing portion 32" has the second tapered part 32*a* and the third tapered part 32*b* described above, the diluted sample gas DG generated on the upstream side of the second tapered part 32*a* in the internal space IS1" increases its flow velocity in the second tapered part 32*a*, and further scatters in the third tapered part 32*b* in the inner diameter direction of the internal space IS1".

When the diluted sample gas DG flows in the internal space IS1" as described above, the particulate matter FP contained in the diluted sample gas DG can be further dispersed in the internal space IS1" of the mixing portion 32". As a result, the diluted sample gas DG can be generated in which the particulate matter FP contained in the sample gas SG is uniformly diluted.

As one of the plurality of introduction tubes 34*c* is disposed at a position point-symmetric to another one of the plurality of introduction tubes 34*c* with respect to the center C2 of the cross section of the first tapered part 33*a*, the dilution gas AR introduced from one introduction tube 34*c* collides with the dilution gas AR introduced from another introduction tube 34*c* that is point-symmetric to the one introduction tube 34*c*, at the center and its vicinity of the cross section of the mixing portion 32", so that the gas in the mixing portion 32" can be prevented from contacting with the inner wall surface of the mixing portion 32" and that gas flow in the mixing portion 32" can be stabilized. As a result, dispersion of the particulate matter in the mixing portion 32" can be stabilized. Further, as contacts of the gas in the mixing portion 32" with the inner wall surface are reduced, a loss of the particulate matter due to adhesion of the same to the inner wall surface can also be suppressed.

The diluter 3" having the structure described above can be applied to an analysis system that regards an exhaust gas discharged from an engine of an automobile as the sample gas SG, for example. This sample gas SG contains the particulate matter FP having a particle size of a few tens nanometers at a high concentration.

Figure 14:
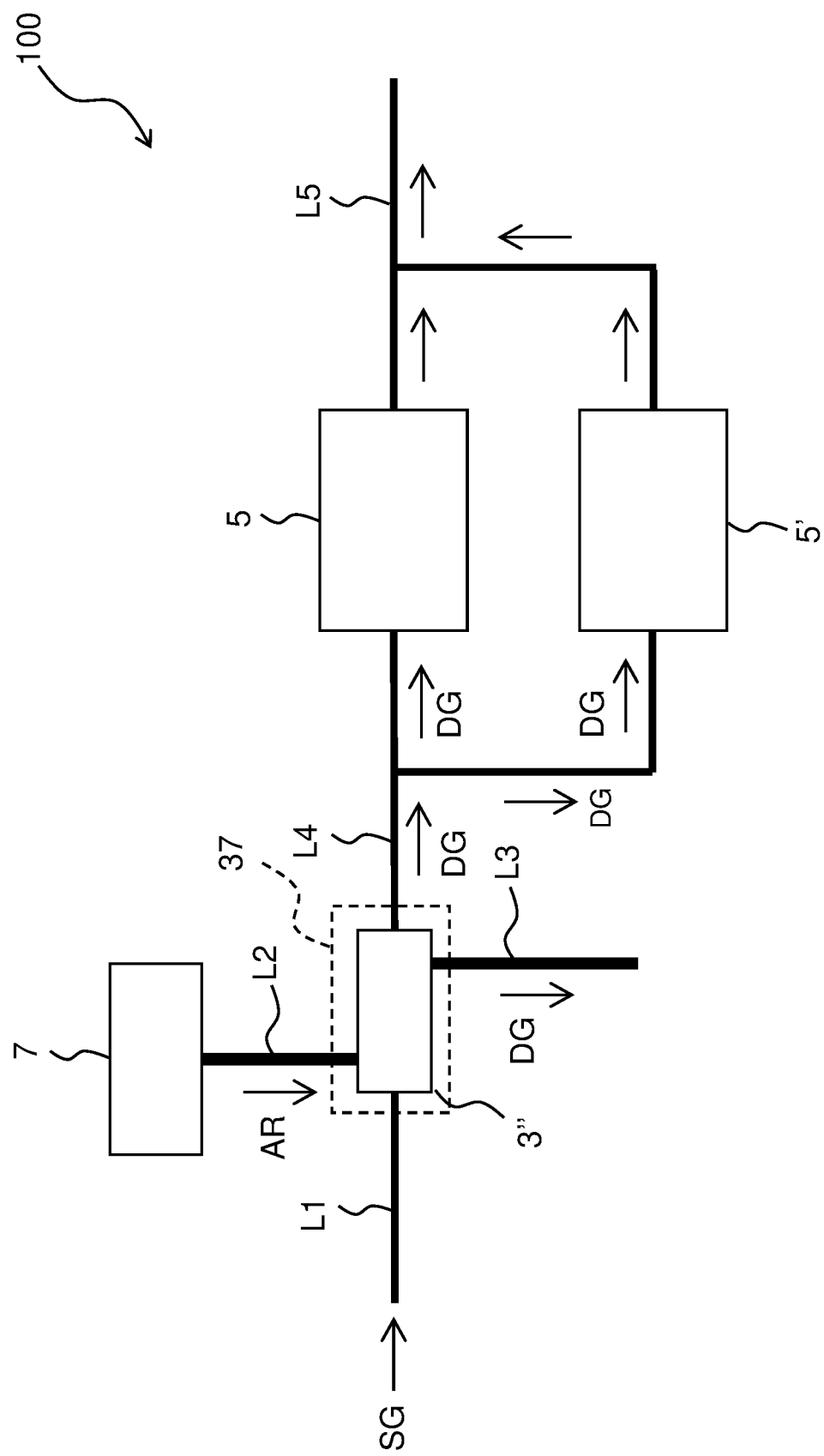
FIG. 14 is a diagram illustrating another example of the analysis system.

With reference to FIG. 14, a structure of an analysis system is described, which includes the diluter 3" described above and regards an exhaust gas discharged from an engine as the sample gas SG. FIG. 14 is a diagram illustrating another example of the analysis system. It should be noted that FIG. 14 illustrates a structure of a part of the analysis system described above, in which the diluter 3", the analysis device 5, and a counting unit 5' described later are disposed.

In the analysis system that regards an exhaust gas from an engine as the sample gas SG, the diluter 3" includes a heating portion 37. The heating portion 37 heats at least the mixing portion 32", the connection portion 33, and the introduction portion 34". In this embodiment, the heating portion 37 heats the first tapered part 33*a* of the connection portion 33, the second tapered part 32*a* and the third tapered part 32*b* of the mixing portion 32", the introduction tube 34*c*, and the sampling portion 36. The heating portion 37 is a heating device such as a heater that can cover the connection portion 33, the mixing portion 32", and the introduction portion 34", for example.

An exhaust gas from an engine of an automobile contains volatile organic components. If the diluter 3" has a low temperature, the volatile organic components aggregate to make particles, so as to disturb the analysis of the particulate matter FP contained in the exhaust gas to be measured.

Therefore, as the diluter 3" includes the heating portion 37 described above, even if the sample gas SG contains volatile organic components, the volatile organic components in the diluter 3" can be volatilized by heating, and the volatile organic components can be prevented from aggregating to make particles. In addition, even if the sample gas SG contains moisture at a high concentration, heating can prevent aggregation of moisture inside the diluter 3".

In order to volatilize the volatile organic components described above and to prevent aggregation of the same, the diluter 3" is heated to a temperature of 150 degrees Celsius or more, for example.

It should be noted that the heating portion 37 may be capable of heating the entire diluter 3" including not only the diluter 3" but also other portions (such as the inflow portion 31).

The analysis system regarding an exhaust gas from an engine as the sample gas SG further includes, in addition to the analysis device 5 described above, the counting unit 5' as a device that measures the particulate matter FP to be measured.

The counting unit 5' is connected to a gas line branched from the fourth gas line L4 and is capable of introducing the diluted sample gas DG. The counting unit 5' counts the number of the particulate matter FP contained in the diluted sample gas DG. As the analysis system includes the counting unit 5', it is possible to obtain accurate information about the particle number concentration of the particulate matter FP contained in the diluted sample gas DG.

The counting unit 5' may be a condensation particle counter (CPC), for example. This condensation particle counter works as follows. A supersaturated alcohol atmosphere is formed in the counter, and the particulate matter FP passes through the atmosphere, so that alcohol droplets condense around the particulate matter FP to grow to large particles and then are discharged from a slit. Then, the discharged particulate matter FP is counted with a laser beam.

As another example of the counting unit 5', there is a diffusion charger sensor (DCS), for example. This diffusion charger sensor detects the particle number concentration of the particulate matter FP, by giving charge to the surface of the particulate matter FP in the sample gas SG, and by detecting the charged charge amount.

It should be noted that the third embodiment is different from the first or second embodiment only in the structure of the diluter 3" (the forms of the mixing portion 32" and the introduction portion 34", and the heating portion 37) and in that the analysis system includes the counting unit 5', and other structures of the analysis system 100 are the same between the third embodiment and the first or second embodiment. Therefore, description of components other than the diluter 3" and the counting unit 5' is omitted.

In addition, the analysis system described above may have a structure different from that of the analysis system 100 of the first or second embodiment, as necessary, for regarding an exhaust gas from an engine of an automobile as the sample gas SG.

4. Other Embodiments

Although the plurality of embodiments of the present invention are described above, the present invention is not limited to the embodiments described above, but can be variously modified without deviating from the spirit of the invention. In particular, the plurality of embodiments and variations described in this specification can be arbitrarily combined if necessary.

(A) In the diluter 3, 3', 3" of the first to third embodiment, during dilution of the particulate matter FP contained in the sample gas SG, the mixing portion 32, 32" may be vibrated. For instance, a device (vibration unit) such as a vibrator that vibrates the mixing portion 32, 32" at a predetermined period may be attached to the outside of the side wall of the mixing portion 32, 32". In this way, during dilution of the particulate matter FP, the particulate matter FP adhered to the inside of a side wall of the mixing portion 32, 32" can be removed.

(B) The second tapered part 32a and the third tapered part 32b may be provided to the mixing portion 32 of the first or second embodiment, similarly to the third embodiment.

(C) In the diluter 3, 3' of the first or second embodiment, instead of the introduction portion 34, 34' having the introduction port 34a, 34a' and the dilution gas filling portion 34b, it is possible to constitute the introduction portion 34 by providing a plurality of introduction tubes that allow the dilution gas AR to flow into the internal space IS1, along the length direction of the side wall of the mixing portion 32.

(D) The analysis device 5 that is used for the analysis system 100 is not limited to one that performs the measurement of the collected amount of the particulate matter FP and the content analysis thereof. For instance, the analysis device including only the collected amount measuring unit 55 described above without the component analyzing unit 57 may be used for the analysis system 100.

(E) The component analyzing unit 57 in the analysis device 5 is not limited to one that performs the identification of elements contained in the particulate matter FP and the measurement of contents of the elements. For instance, the component analyzing unit 57 may be one that identifies organic matter contained in or adhered to the particulate matter FP and measures contents thereof.

(F) The analysis device 5 is not limited to one that collects the particulate matter FP to the collection filter 51 and analyzes the particulate matter FP collected to the collection filter 51. The analysis device 5 may be one that analyzes the particulate matter FP contained in the diluted sample gas DG as it is.

For instance, the analysis device 5 may be one that emits light (such as a laser beam) toward the gas flow of the diluted sample gas DG sampled by the sampling portion 36, and is capable of measuring concentration (the number), particle size, mass, or the like of the particulate matter FP contained in the diluted sample gas DG, based on a scattered state of the light.

(G) The whole or a part of the fifth gas line L5, the second buffer tank BT2, the second flow rate adjuster FC2, and the second pump P2 of the analysis system 100 may be included in the analysis device 5.

(H) The heating portion 37 may be disposed not only in the diluter 3" described in the third embodiment, but also in the diluter 3 described in the first embodiment or in the diluter 3' described in the second embodiment.

(I) The counting unit 5' that counts the number of the particulate matter FP contained in the diluted sample gas DG can be disposed not only in the analysis system described in the third embodiment but also in the analysis system 100 described in the first or second embodiment.

INDUSTRIAL APPLICABILITY

The present invention can be widely applied to an analysis system that analyzes particulate matter contained in a sample gas and a diluter that dilutes particulate matter contained in the sample gas at a high concentration.

REFERENCE SIGNS LIST

100 analysis system
1 sampling probe
3, 3', 3" diluter
31 inflow portion
32, 32" mixing portion
IS1, IS1" internal space
32a second tapered part
32b third tapered part
33 connection portion
33a first tapered part
34, 34', 34" introduction portion
34a, 34a' introduction port
34b dilution gas filling portion
IS2 dilution gas filling space
34c introduction tube
35 discharge portion
36 sampling portion
37 heating portion
5 analysis device
5' counting unit
51 collection filter
511 moving unit
511a take-up reel
511b feed reel
53 collection unit 531 discharging portion
533 sucking portion
531a, 533a opening part
55 collected amount measuring unit
55a beta-ray source
55b beta-ray detector
57 component analyzing unit
57a X-ray source
57b detector
59 control unit
591 input unit
593 dilution control unit
7 feeding device
200 boiler
220 electrostatic precipitator
240 control panel
300 combustion plant
320 chimney
340 control panel
400 measurement device
FL flue
L1 first gas line
L2 second gas line
L3 third gas line
FI filter
FC1 first flow rate adjuster
P1 first pump
L4 fourth gas line
L5 fifth gas line
BT1 first buffer tank
BT2 second buffer tank
FC2 second flow rate adjuster
P2 second pump
SG sample gas
FP particulate matter
AR dilution gas
DG diluted sample gas

The invention claimed is:

1. A diluter comprising:
an inflow portion configured to allow the sample gas containing particulate matter to flow in;
a mixing portion having an inner diameter larger than that of the inflow portion, configured to mix the sample gas flowing in from the inflow portion with a dilution gas in an internal space, to generate a diluted sample gas;
a discharge portion configured to discharge the diluted sample gas;
a connection portion configured to connect the inflow portion and the mixing portion, and having a first tapered part whose inner diameter increases from a side connected to the inflow portion toward a side connected to the mixing portion; and
an introduction portion configured to introduce the dilution gas into the internal space from a position downstream of the connection between the first tapered part and the inflow portion, wherein the introduction portion has a plurality of introduction ports arranged along an inflow direction of the sample gas in a side wall of the mixing portion, and wherein the introduction ports are inclined downstream relative to the inflow direction of the sample gas to the internal space, and introduces the dilution gas into a downstream side of the internal space.

2. The diluter according to claim 1, wherein the introduction portion introduces the dilution gas into the internal space in a direction diagonal to an inflow direction of the sample gas into the internal space.

3. The diluter according to claim 1, wherein the introduction portion introduces the dilution gas into the internal space in a direction perpendicular to an inflow direction of the sample gas into the internal space.

4. The diluter according to claim 1, wherein
one of the plurality of introduction ports is disposed at a position point-symmetric to another one of the plurality of introduction ports with respect to the center of a cross section of the mixing portion.

5. The diluter according to claim 4, wherein the introduction portion has a dilution gas filling space that is communicated to the internal space of the mixing portion through the plurality of introduction ports and is filled with the dilution gas.

6. The diluter according to claim 1, wherein
the introduction portion is provided with a plurality of introduction tubes each of which has one end connected to a position downstream of the connection between the first tapered part and the inflow portion, and the other end that allows the dilution gas to flow in, and
one of the plurality of introduction tubes is disposed at a position point-symmetric to another one of the plurality of the plurality of introduction tubes with respect to the center of a cross section of the first tapered part.

7. The diluter according to claim 1, wherein the mixing portion includes a second tapered part whose inner diameter decreases from an upstream side to a downstream side, and a third tapered part whose inner diameter increases from a side of the second tapered part toward the downstream side.

8. The diluter according to claim 1, further comprising a sampling portion configured to sample the diluted sample gas from the internal space.

9. The diluter according to claim 8, wherein the sampling portion is disposed on an upstream side of the discharge portion.

10. The diluter according to claim 8, wherein a ratio between a cross-sectional area of the sampling portion and that of the internal space at a position where the sampling portion is disposed is determined such that a flow velocity of the diluted sample gas in the sampling portion is more than that in the internal space.

11. The diluter according to claim 1, further comprising a vibration portion configured to vibrate the mixing portion.

12. The diluter according to claim 1, further comprising a heating portion configured to heat the mixing portion, the connection portion, and the introduction portion.

13. An analysis system comprising:
a diluter configured to mix a sample gas containing particulate matter with a dilution gas to generate a diluted sample gas; and
an analyzing unit configured to analyze the particulate matter contained in the diluted sample gas, wherein
the diluter includes:
an inflow portion configured to allow the sample gas containing particulate matter to flow in;
a mixing portion having an inner diameter larger than that of the inflow portion, configured to mix the sample gas flowing in from the inflow portion with a dilution gas in an internal space to generate a diluted sample gas;
a discharge portion configured to discharge the diluted sample gas;
a connection portion configured to connect the inflow portion and the mixing portion, and having a first tapered part whose inner diameter increases from a side connected to the inflow portion toward a side connected to the mixing portion; and an introduction portion configured to introduce the dilution gas into the internal space from a position downstream of the connection between the first tapered part and the inflow portion, wherein the introduction portion has a plurality of introduction ports arranged along an inflow direction of the sample gas in a side wall of the mixing portion, and wherein the introduction ports are inclined downstream relative to the inflow direction of the sample gas to the internal space, and introduces the dilution gas into a downstream side of the internal space.

14. The analysis system according to claim 13, further comprising a collection unit configured to sample the diluted sample gas and collect the particulate matter contained in the sampled diluted sample gas to a collection filter.

15. The analysis system according to claim 13, wherein the analyzing unit includes a collected amount measuring unit configured to measure a collected amount of the particulate matter.

16. The analysis system according to claim 13, wherein the analyzing unit includes a component analyzing unit configured to analyze components contained in the particulate matter.

17. The analysis system according to claim 13, wherein the analyzing unit includes a counting unit configured to count the number of the particulate matter.

18. An analysis method using an analysis system comprising: a diluter including an inflow portion, a mixing portion having an inner diameter larger than that of the inflow portion, a discharge portion, a connection portion configured to connect the inflow portion and the mixing portion and having a first tapered part whose inner diameter increases from a side connected to the inflow portion toward a side connected to the mixing portion, an introduction portion configured to introduce a dilution gas from a position downstream of the connection between the first tapered part and the inflow portion, wherein the introduction portion has a plurality of introduction ports arranged along an inflow direction of the sample gas in a side wall of the mixing portion, and wherein the introduction ports are inclined downstream relative to the inflow direction of the sample gas to the internal space, and introduces the dilution gas into a downstream side of the internal space; and an analyzing unit, the method comprising:

mixing a sample gas containing particulate matter flowing in from the inflow portion with the dilution gas introduced from the introduction portion, in the internal space of the mixing portion to generate a diluted sample gas; and analyzing the particulate matter contained in the diluted sample gas using the analyzing unit.

* * * * *